(12) United States Patent
Burmester et al.

(10) Patent No.: US 8,714,185 B2
(45) Date of Patent: May 6, 2014

(54) DEVICE FOR THE PIPING OF PROCESS SYSTEMS IN THE FOOD AND BEVERAGE INDUSTRY

(75) Inventors: Jens Burmester, Grambek (DE); Matthias Suedel, Ratekau (DE); Andreas Duerig, Visalia, CA (US); Ashok Nangpal, Ellicott Citi, MD (US); David Medlar, West Friendship, MD (US)

(73) Assignee: GEA Tuchenhagen GmbH, Buchen (DE)

( * ) Notice: Subject to any disclaimer, the term of this patent is extended or adjusted under 35 U.S.C. 154(b) by 513 days.

(21) Appl. No.: 13/056,831

(22) PCT Filed: Jul. 22, 2009

(86) PCT No.: PCT/EP2009/005320
§ 371 (c)(1),
(2), (4) Date: Apr. 1, 2011

(87) PCT Pub. No.: WO2010/012409
PCT Pub. Date: Feb. 4, 2010

(65) Prior Publication Data
US 2011/0192475 A1    Aug. 11, 2011

(30) Foreign Application Priority Data
Jul. 31, 2008   (DE) .......................... 10 2008 035 940
Oct. 15, 2008   (DE) .......................... 10 2008 051 819

(51) Int. Cl.
*F16K 5/10*     (2006.01)
*F15D 1/00*     (2006.01)

(52) U.S. Cl.
USPC ...................... 137/312; 137/240; 137/614.17

(58) Field of Classification Search
USPC .................... 137/237, 238, 240, 312, 614.11, 137/614.17, 614.18, 255, 266
See application file for complete search history.

(56) References Cited

U.S. PATENT DOCUMENTS 7,302,958 B2 * 12/2007 Worczinski ................... 137/312
2008/0257417 A1  10/2008 Thomaschki

FOREIGN PATENT DOCUMENTS

DE        2847038 A1    5/1980
DE        2948534 A1    7/1981
(Continued)

OTHER PUBLICATIONS

Eco-Matrix (The Piping System for Process Plants); Tuchenhagen Brewery Systems, Oct. 2006.

*Primary Examiner* — Kevin Lee
(74) *Attorney, Agent, or Firm* — Vidas, Arrett & Steinkraus, P.A.

(57) ABSTRACT

A device for the piping of process systems in the food and beverage industry in that:
   the respective valve distributor tree (rvdt) opens immediately into the lower tank bottom of a respectively associated tank of the process system, and/or
   the rvdt is connected via an associated pipe connection to an associated process aggregate or to the lower tank bottom of the process apparatus, and the pipe connection opens out into the tank-side or process-aggregate-side end of the valve distributor tree (vdt);
a stirring device (16) which is operative in the entire interior space of the hollow structure is disposed in the vdt; and/or
the vdt with the entire interior space of the hollow structure is part of a circulation line which extends over the tank or the process aggregate; and/or
the vdt can be recuperatively acted upon by a heat transfer medium (W).

31 Claims, 10 Drawing Sheets

(56) References Cited

FOREIGN PATENT DOCUMENTS

| DE | 3042895 | A1 | 5/1982 |
| DE | 10108259 | C1 | 1/2002 |
| DE | 102005051467 | A1 | 4/2007 |
| DE | 10 2006 059 556 | B3 | 10/2007 |
| WO | 9316307 | | 8/1993 |
| WO | 9854494 | | 12/1998 |

* cited by examiner

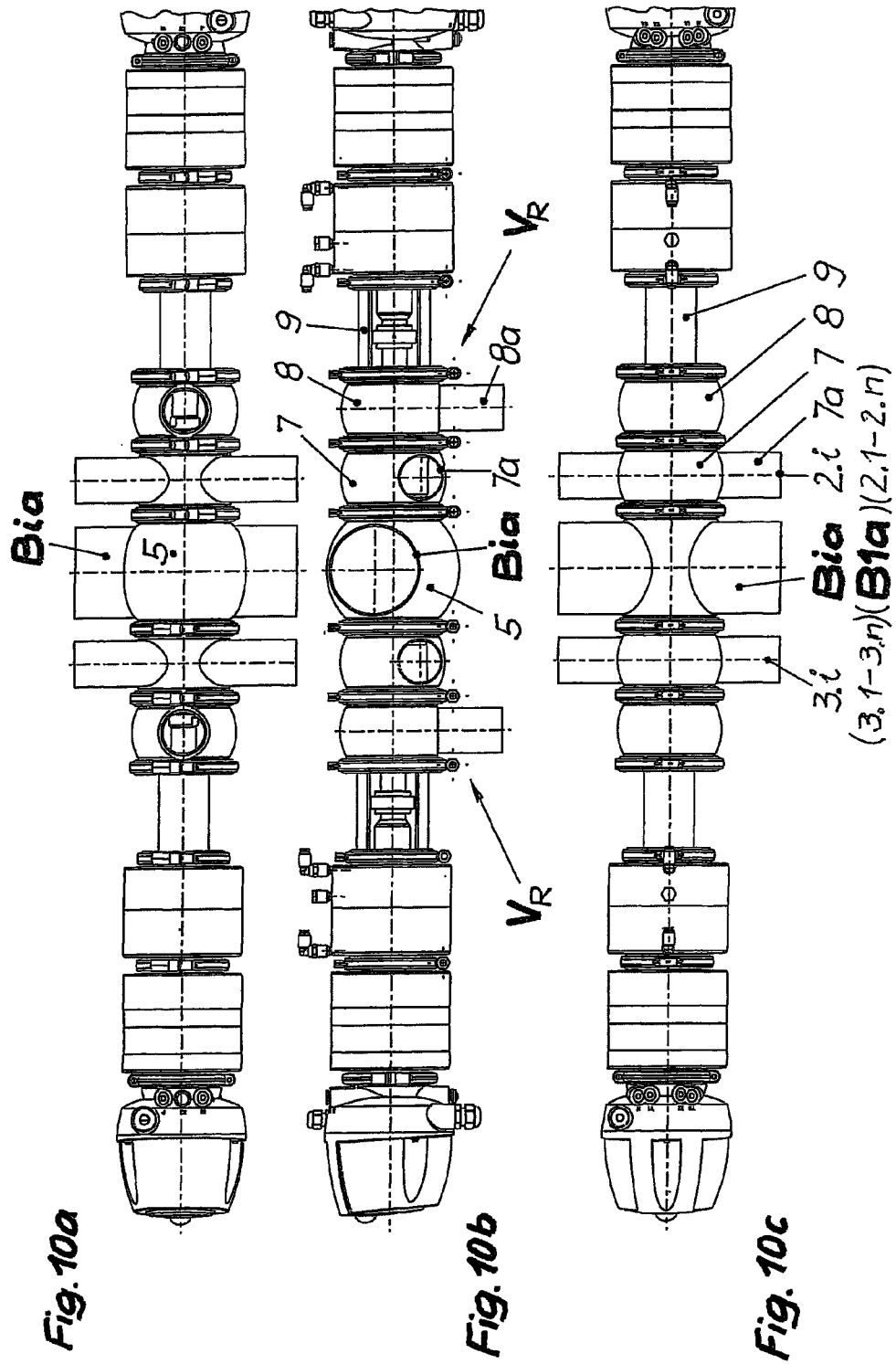

DEVICE FOR THE PIPING OF PROCESS SYSTEMS IN THE FOOD AND BEVERAGE INDUSTRY

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The invention relates to a device for piping of process systems in the food and beverage industry, and a method for operating such a device; these piping systems are used e.g. in particular where the process equipment employed for product treatment and product transfer is subject to high microbiological quality requirements and requirements for excellent cleanability in place (so-called "CIP capability"—Clean In Place). The application relates to areas of technology such as dairy technology, pharmaceutical technology, and biotechnology.

The general prototype of such a piping system is disclosed, e.g., in DE 101 08 259 C1, but this is limited to a piping device wherein a so-called valve distributor tree is associated with a tank of a tank farm, opens out directly from the lower bottom of the tank, and has an upwardly oriented, typically vertical course. The process lines and function valves are attached directly below the respective tank outlet. This piping system has proved itself in practice, over time; it is described in more detail in a publication of the firm GEA Tuchenhagen Brewery Systems entitled "ECO-Matrix®, 223d-10/06"; it is designated ECO-Matrix®, and descriptions are provided of the economic benefits provided and the influence on product quality.

In the abovementioned piping system, the function valves may be attached laterally on the tank outlet tree (the so-called valve distributor tree) or vertically on the bottom flange of the tank. This piping technology significantly minimizes the formation of contamination and its later distribution in the process system. The piping system built separately from the tank makes possible a complete product discharge and independent cleaning, independently of the tank.

The valve distributor tree is designed as an elongated hollow body oriented essentially vertically and having connection openings for connecting its inner spaces to pipelines of a piping system which extend laterally past the valve distributor tree. A valve that is mix-proof in its seat region is disposed in each connection between the pipeline and the associated connection opening, and said valve switches this connection in immediate proximity to the hollow body. As an anti-mixing valve a so-called double seat valve which has two closing members movable relative to each other, or a so-called double seal valve which has two seals separated in the stroke direction on a single closing member, or a so-called leak-proof disk valve can be used. Between the axially separated sealing locations of the anti-mixing valve there is a leakage space which is connected via at least one connection path with the surroundings of the anti-mixing valve.

As a preferred anti-mixing valve, the abovementioned double seat valve has been used for some time in piping systems of the type described, which valve has valve rods which are disposed concentrically one inside the other, as the closing members, which rods pass on one side through the valve housing and out of it to the location of a drive means. A double seat valve with such a closing member and valve rod configuration is known from U.S. Pat. No. 4,436,106 A. The leakage space disposed between the two closing members is drained via a leakage discharge between the valve rods of the independently driven first closing member and a hollow rod of the dependently driven second member, which hollow rod surrounds the valve rod. The second closing member is designed as a seat disk in the form of a conical closing sleeve that at its end facing the first closing member bears an axial seat seal which cooperates with the valve seat on the valve housing. The first closing member is also designed as a seat disk, which cooperates with a conical valve seat.

In EP 0 625 250 B1, a double seat valve generally according to U.S. Pat. No. 4,436,106 A is described, wherein the first closing member is formed with a radial sealing means and the second closing member is formed with the known axial sealing means. In the closed position of the valve, the radial sealing means is sealingly accommodated in a cylindrical seat surface, and the end of the second closing member directed toward the first closing member, which second closing member is in the form of a hollow rod, bears the axial seat seal which acts on a seat surface on the valve housing. In EP 0 625 250 B1, with reference to the general double seat valve according to U.S. Pat. No. 4,436,106 A it is stated (see Col. 2 line 56 to Col. 3 line 16) that such double seat valves, starting from the configuration in FIGS. 1 and 2 of U.S. Pat. No. 4,436,106 A, can essentially be disposed in any installation orientation, thus e.g. rotated by 180°, thus with vertically downwardly oriented valve rods, or even in a horizontal or inclined orientation. In the case of downwardly oriented valve rods, with this term also including an inclined orientation of the valve rods, the leakage fluid can independently, freely drain off under the influence of gravity (via the annular gap between the valve rod and the hollow rod) (FIG. 2).

WO 98/54494 A1 discloses a double seat valve for the food industry, wherein the second closing member, in the form of a hollow rod, has on its outer side an axially and/or radially acting second seat seal and on its inner side a cylindrical accommodating bore, on its end segment directed toward the first closing member, which first closing member is in the form of a sliding plunger and is independently actuatable. The end section receiving the accommodating bore extends somewhat beyond the second seat seal, and the accommodating bore is formed with the same diameter as a cylindrical first seat surface, which surface cooperates with a radially acting first seat seal of the first closing member. Due to the axial spacing of the second seat seal from the end-face-side bounding surface of the end section of the second closing member, the seat seals, and with them the associated seat surfaces, do not directly adjoin each other, but rather are connected together by a relatively long, angled gap. In the closed position of the second closing member, the accommodating bore and the first seat surface have moved flush against each other.

A general pipe branching arrangement described in DE 10 2005 051 467 A1 is based on a device system according to DE 101 08 259 C1, and in this system associates an anti-mixing valve with the connections of the hollow body, wherewith the first closing member of the valve is independently driven, and in its opening movement it sealingly comes to abut against the second closing member, which is in the form of a seat disk, and also carries this (the second closing member) into the open position. The second closing member has a second seat seal on its end directed toward the first closing member, which second seat seal cooperates with a second seat surface which adjoins a cylindrical first seat surface. The first closing member, in the form of a sliding plunger, has a radially acting first seat seal, which in the closed position of the valve is sealingly accommodated in the first seat surface. The valve rods for the closing members are disposed mutually concentrically, and are guided through, and out of, the valve housing on one side.

Thus the valve according to DE 10 2005 051 467 A1, similarly to that of EP 0 625 250 B1 with reference to U.S. Pat. No. 4,436,106 A, being disclosed under the point of view of the generally possible installation arrangement, is oriented at an incline to the hollow body, and has, in addition to the radial sealing means on the first closing member and the axial sealing means on the second closing member, a so-called middle seal, which in the open position of the double seat valve is operatively disposed between the two closing members and is disposed at the second closing member. Due to the inclined orientation, the leakage space of the valve has a peripheral wall that extends from a connection-side inlet up to an outlet-side leakage outlet opening which is at a distance from the inlet, which peripheral wall is inclined in the direction of the gravitational force toward the leakage outlet opening. The aim of this measure is to provide means of automatic discharge of leakage fluid collecting in the leakage space, from said leakage space.

The known pipe branching arrangement according to DE 10 2005 051 467 A1, along with that according to DE 101 08 259 C1, is limited to an arrangement in which the hollow body (valve distributor tree) is associated with a tank in a tank farm, and opens out directly from the bottom of said tank. The automatic drainage of the leakage space is only attained (DE 10 2005 051 467 A1) if the double seat valve is disposed in the necessary inclined orientation at the hollow body, i.e. when the peripheral wall of the leakage space has a sufficient slope. Considering the design of the second closing member in the form of a conical closing sleeve, this requires a significant angle of inclination of the longitudinal axis of the double seat valve with respect to horizontal. The inclined connection of the double seat valve at the hollow body mandates, in each case, radially oriented, circumferential protrusions at the latter that form dead zones for the flow in the longitudinal direction of the hollow body. With flow through the hollow body, this results in disruption of the [laminar] flow at these locations, and in turbulence. These protrusions are difficult to clean in the flow passage.

Further, the so-called middle seal is a major drawback, because it makes the valve more expensive and more apt to malfunction, and in the course of the opening and closing movements, particularly in the so-called "engagement position" of the second closing member when engaged by the first closing member, it makes less satisfactory the desired maximally leakage-free switching of the double seat valve, because of cavern formation between the three seals. Furthermore, in the known double seat valve, the seat cleaning flow arising during the respective seat cleaning of one closing member is directed onto the seal region of the other closing member in its closed position, which other closing member, as a rule, is exposed to the product. This direct impact on the seat region by the respective seat cleaning flow is undesirable because it leads to a conversion of the kinetic flow energy into static pressure, whereby, in the case of defective seat seals, leakage flows of the cleaning agent are generated, which come to flow into the valve housing that is exposed to the product.

In the USA, for example, it is required in the case of larger seal defects, or even with a loss of one of the two seat seals, that in the course of the seat cleaning of the respective other closing member no cleaning agent is permitted to pass through via the respective seal defect or the seat region without a seat seal. Under these conditions, such a double seat valve does not only have to meet the requirement to limit the quantity of cleaning agent and to avoid a direct impact of the seat region in the course of the seat cleaning, but also the requirement to withdraw the seat cleaning flow in a condition which is as turbulence-free as possible, initially into the leakage space and from there into the surroundings, without the seat cleaning flow directly flowing against the respectively closed seat area or increasing the pressure on it. This case concerns so-called "PMO capability", which means that the anti-mixing double seat valve is required to be in operation 365 days a year without interruptions for cleaning, and in the process is capable of seat cleaning on one side, while the other side remains in contact with the product and is thus closed.

In traditional piping systems of the type described initially supra, which were the starting point for the so-called ECO-Matrix® piping systems, and in the latter, primarily high technology leak-proof valves (the above-described double seat valves or so-called double seal valves) are employed; as mentioned, these are referred to as "anti-mixing valves". A double seal valve is a valve with a single closing member having two axially separated sealing locations, between which the above-described leakage space is disposed. These two leak-proof stroke valves combine all necessary characteristics which presently can be required of a process valve in the area of application under consideration, wherewith if necessary also so-called "seat cleaning" is one of the features. These stroke valves are costly to fabricate and thereby cost-intensive, however.

DE 101 08 259 C1 also identifies as suitable anti-mixing valves so-called "disk valves" having two seals disposed at a distance apart on the sealing surface of the closing member, which closing member is in the form of a disk element, wherewith a leakage space which extends around in a ring shape is disposed between said seals, which leakage space is connected with the surroundings of the disk valve via at least one connection path. DE 101 08 259 C1 does not contain additional information as to how specifically the known piping system is to be realized in connection with leak-proof disk valves.

The present invention expands on the concept of the anti-mixing valve in the form of a disk valve, in that it proposes that disk valves having two separate closing members, each in disk form, axially separated from each other, be employed, wherewith these two closing members are actuated simultaneously or with a time lag, wherewith each closing member forms a sealing location with the associated housing segment, and wherewith a leakage space is provided between the two axially separated sealing locations, which leakage space is connected with the surrounding of the valve via at least one switchable connection path (see, e.g., DE 28 47 038 C3; DE 29 48 534 C2; DE 30 42 895 C2).

It is the object of the present invention to devise a device for piping, of a general type described hereinabove, which device has high operating safety and meets the highest requirements for quality of the fluid products processed in it, which device overall, including its anti-mixing valves, is easy and inexpensive to fabricate, and which, under all practically occurring arrangement variants of the valve distributor tree in relation to the associated process aggregate or tank of the process apparatus, in the respective valve distributor tree, reproduces to the extent possible, the same technological conditions and condition parameters as in the process aggregate or tank. It is a further object of the invention to suggest a method of operating a described device, which method, to the extent possible, provides the same technological conditions and condition parameters in the valve distributor tree as in the tank or process aggregate.

SUMMARY OF THE INVENTION

The underlying problem concerning the device is solved by a device for piping, (general device according to DE 101 08 259 C1; "first solution"), (general device according to DE 10 2005 051 467 A1; "second solution"). Advantageous refinements of the proposed device according to the invention are the subjects of the various dependent claims. The underlying problem concerning the method is solved by a method of operating a described device.

With the "first solution" or the "second solution", a first basic concept of the invention lies in the fact that in the valve distributor tree a stirring device is disposed which is operative in the entire interior space of the hollow structure, and/or that the valve distributor tree along with the entire interior space of the hollow structure comprises part of a circulation line which extends through the tank or process aggregate. The stirring device serves to mix the liquid in the interior of the hollow structure "in place", thereby homogenizing it with respect to its consistency and contents. By the necessary transport of the liquid over the circulation line from the interior space of the hollow structure into the tank or process aggregate and back to the starting point in the interior space of the hollow structure, one maximally achieves identical technological conditions and condition parameters in the valve distributor tree and in the tank or process aggregate. The mixing by the stirring device and the circulation via the circulation line may be alternative measures or mutually supplemental measures; i.e. they may be superposed (in addition to other possible process engineering treatments of the given substrate).

Alternatively to or in addition to the above-described solution[s], a heat transfer medium may be recuperatively employed with the valve distributor tree. This provides a further means to maximally reproduce in the given valve distributor tree the same technological conditions and condition parameters as prevail in the process aggregate or tank.

This advantage is provided regardless of whether the given valve distributor tree opens out directly into the lower tank bottom of an associated tank or process apparatus ("first arrangement variant"); and/or whether the given valve distributor tree is connected via an associated pipe connection to an associated process aggregate (or tank of the process aggregate), and the pipe connection opens out into the tank-side or process-aggregate-side end of the valve distributor tree ("second arrangement variant"). It is further proposed that in each of these two "arrangement variants" the valve distributor tree has an orientation from the bottom upward, typically vertically upward ("first orientation variant"), or the valve distributor tree extends perpendicularly, typically horizontally ("second orientation variant"). Another basic concept of the invention is the combination of the "first arrangement variant" or "second arrangement" with the "first orientation variant" or "second orientation variant".

In all these cases (first and second solution in combination with the first or second arrangement variant and in turn the first or second orientation variant), the fluid products which are to be fed from or withdrawn from the piping system flow through the hollow structure delimited by the valve distributor tree, in a path via connection openings, whereby the given fluid can be separated out separately and subjected to switching in an anti-mixing manner, through a leak-proof valve, in this hollow structure, in immediate proximity to the border presented by the pipelines of the piping system which pipelines lead to the hollow structure.

The "second solution" in combination with the "first arrangement variant" or "second arrangement variant", wherein the valve employed is solely an anti-mixing double seat valve, is distinguished, inter alia, by the fact that the connection opening forms the cylindrical first seat surface of the double seat valve.

According to an advantageous embodiment, in the "first orientation variant", wherein the valve distributor tree extends from the bottom upward, typically vertically upward, the first and second groups of pipelines are mutually serially disposed, on opposite sides of the hollow structure, in mutually parallel planes which are parallel to the longitudinal axis of the hollow structure. Such a piping arrangement is exceptionally compact, space saving, uncluttered, and easy to access.

According to another proposal, in the "second orientation variant", wherein the valve distributor tree extends transversely, typically horizontally, the first and second groups of pipelines are disposed next to each other in mutually parallel planes and on one side or the opposite side of the hollow structure, wherewith they extend past the hollow structure in planes which intersect the longitudinal axis of the hollow structure. Such a piping arrangement is used if the installation height beneath the tank or the process aggregate is limited, and therefore the arrangement of a valve distributor tree with an upward rising, typically vertical orientation is not possible; and if also the entire relevant piping arrangement is to be disposed beneath the outlet of the tank or the process aggregate.

In the two abovementioned "orientation variants" of the valve distributor tree, where necessary the liquid is mixed in the interior space of the hollow structure, either by a stirring device or by circulation. In the latter case, as provided according to another proposal, the circulation line is connected to the tank or process aggregate by a first circulation line segment which comprises the hollow structure as an integral component, and the circulation line is returned to the tank via a third circulation line segment, in which an advancing device is disposed. By this piping in the form of a circulation line, it is very simple to achieve maximum similarity of the technological conditions and condition parameters in the hollow structure and in the tank or in the process aggregate.

Also proposed is to provide a second circulation line segment as a bypass line to bypass the first circulation line segment, which merges with the latter on both sides, and bridges over at least the hollow structure; this allows one to intensify the outflow from the tank via this piping arrangement, either by circulation of liquid through it (the second circulation line segment) or by means of other flanking means (not described here).

According to an advantageous embodiment which builds on this basic solution, the second closing member in the form of a hollow rod at its end section accommodating the second seat seal has a cylindrical accommodating bore on the inside that is formed with the same diameter as the cylindrical first seat surface. Furthermore, according to the invention, in the closed position of the second closing member, the accommodating bore and the first seat surface have moved flush against each other. This achieves leakproof switching without the necessity of a third sealing means between the two closing members as is the case with the pipe branching arrangement according to the above-described state of the art (DE 10 2005 051 467 A1). Also, this solution avoids direct contact of the seat region of the double seat valve in the seat cleaning, and with horizontal orientation of the double seat valve the leakage space itself is self-emptying.

According to another proposal, the drive means of the anti-mixing double seat valve are designed such that the valve is subjected to seat cleaning by an associated partial stroke of its closing members. The double seal valve $V_C$ experiences such a seat cleaning on its two sealing locations by an associated partial stroke (H1, H2) of its closing member.

It is also proposed to limit the associated seat cleaning flow to a desired minimum volume of flow, wherewith the seat cleaning of the first closing member occurs by the first partial stroke in the direction opposite to the opening movement, and the seat cleaning of the second closing member occurs by the second partial stroke in the same direction [as the opening movement], and wherewith, in the respective seat cleaning position, a leakage-space-side first choke gap is provided at the first closing member and a second choke gap is provided at the second closing member on the side facing away from the leakage space.

Thereby it is possible to subject the at least one anti-mixing double seat valve disposed at the hollow structure not only to a cleaning of its leakage space in the closed position and in the open position, but also to a seat cleaning of the one sealing location when the respectively other sealing location remains in the closed position. With a double seal valve, analogously, at least one cleaning of the leakage space in the closed position and a seat cleaning of the two sealing locations are provided for. Thus, the proposed device enables all presently customary valve cleanings in the seat region of the anti-mixing stroke valve, which cleanings are possible with the abovementioned double seat valves in customary valve blocks.

In order to further improve the protection against direct impacting of the seat region of the second closing member in the course of the seat cleaning of the first closing member, it is further proposed that the second closing member, with a closing-member-side detent surface, makes use of a metallic detent at the second seat surface, wherewith an associated seat-surface-side detent surface immediately adjoins the first seat surface. This measure further improves the "PMO capability" mentioned above of the double seat valve.

The hollow structure allows a very simple connection of the anti-mixing valves (double seal valve, double seat valve, double-sealing disk valve), if the valve is in the form of a ring-shaped housing in the peripheral region of its connection opening, which housing if necessary accommodates a seat surface of the anti-mixing valve (double seal valve, disk valve) or the two seat surfaces of the double seat valve, and/or which housing serves for closing of the valve housing.

With an eye to the use of the double seat valve, it is further provided that a second closing member opens out into a leakage and discharge housing which adjoins the side of the valve housing which side is directed away from the ring-shaped housing, and said second closing member is guided and sealed there. Thereby the leakage space can be provided on its entire axial extension length with a flow cross-section that corresponds to the largest nominal flow cross-section of the pipeline connected to the valve housing (satisfying the so-called "3A requirement" in the USA), and the leakage can be collected in the leakage and discharge housing, and can be reliably withdrawn from there. Furthermore, the radial guidance of the second closing member is improved during its opening and closing movement because it is guided additionally in the leakage and discharge housing.

In order to be able to completely empty the convex valve housing it is further proposed that a pipe connection at the valve housing opens tangentially, relative to the arrangement position of the valve housing, with its lowest inner wall line at the deepest point of the interior space of the valve housing.

One can ensure or particularly promote automatic emptying of the leakage space if, as proposed, relative to the arrangement position, the longitudinal axis of the valve housing extends horizontally or, viewed from the connection opening, up to a certain angle to the horizontal; and if thereby an inner peripheral wall of the leakage space is inclined in the direction of gravity toward its (the leakage space's) outlet opening.

For minimizing product loss, for example during a change from the product passage to flow cleaning ("CIP cleaning") of the pipelines, the given pipeline is designed to be piggable. For this purpose, it is proposed that the given pipeline have over its entire length an uninterrupted circular flow cross section, and passes by and is in fluid communication with a respective valve housing of the anti-mixing valve or the respective valve housing of the double-seat valve.

The implementation of the hollow structure turns out to be particularly simple if it is designed as a cylindrical pipe, as is further proposed.

The hollow structure enables complete emptying (without residues) and problem-free cleaning, if its lower end facing away from the respective tank, or from the pipe connection leading from the process aggregate or tank, is connected to a third piping system.

The device is particularly simple, uncluttered and easy to access if the pipelines, according to another proposal, are in the form of pipelines of respective similar function (e.g. filling, emptying, pipe cleaning, etc.), as to all tanks or pipe connections.

Within the context of the invention, piping systems which are simple, uncluttered and easy to access are provided if the valve distributor trees are arranged in rows or matrices.

Alternatively to having the hollow structure in the form of a cylindrical tube, it is further proposed that the hollow structure is comprised of an aggregation of individual structural segments which are connected together in the direction of the longitudinal axis of the hollow structure so as to allow passage of fluid, each of which segments has least one connection opening. These housing parts can be either disk-rete, separate pieces that are added to the hollow structure in its entirety, or can be a one-piece structure in which the individual housing parts are connected together in a material locking manner. In both variant embodiments, the structural segments in the form of housing parts, according to another proposal, may be of different sizes, so that at least one connection opening can be provided on these housing parts, which opening has a flow cross section which depends on the size of the associated housing part. Connection openings having differently sized flow cross-sections are also provided at one housing part. Due to this design diversity, the hollow structure can be adapted, in all of its areas that have through-going flows, to the different technical flow requirements of the connected pipes with different nominal diameters.

In order to adapt the technological conditions and condition parameters in the valve distributor tree to the greatest extent adequately to those in the process aggregate or the tank of the process system, it is further proposed that a stirrer shaft which bears at least one stirrer of the stirring device is operative in the valve distributor tree and extends along the longitudinal axis of said tree. In this way, when the anti-mixing valve is switched, product which is to the maximum extent in its original state prevailing in the process aggregate or tank, without a time lag, is passed from the valve distributor tree into the switched pipeline. The stirrer shaft under this arrangement is driven with reference to the arrangement position of the valve distributor tree either by a first drive from above or by a second drive from below.

If the valve distributor tree opens out directly into the lower tank bottom of the associated tank, it is proposed that the first drive derives from a stirring device in the tank, and the stirrer shaft is aligned with and joined to an upper stirrer shaft via a coupling, wherewith the upper shaft forms a prolongation of the stirrer shaft of the stirring device in the tank. With this solution, an independent drive device for the stirring device in the valve distributor tree is rendered unnecessary. With this drive variant, the guiding and thereby the stability of the stirring device in the valve distributor tree is improved, if the stirrer shaft is extended via the (lower) stirrer into a lower stirrer shaft, and the latter is additionally rotatably mounted in a lower bearing on the lower end of the valve distributor tree.

For the sake of improved stability of the stirring device, it is further proposed, in the instance of a first drive acting from above or a second drive acting from below, that the stirrer shaft at its end directed away from the given drive be additionally rotatably mounted in a lower bearing or an upper bearing in the associated end of the valve distributor tree.

According to yet another embodiment of the device, it is proposed that the valve distributor tree be double-walled, in its entirety or in partial regions; and that the intermediate space(s) forming a heat exchanger be each connected with a respective feed and discharge connection for the heat exchange medium. The principal heat exchange process envisioned is cooling, e.g. because certain operating regulations in the USA for such process systems prescribe an upper temperature limit (e.g. temperature $\theta \leq 7°$ C. in dairy operations in the USA). Fundamentally, however, the inventive means also enable heating of the product in the valve distributor tree.

The means of realizing recuperative heat exchange in the region of the valve distributor tree are very simple, if the given partial region of the double-walled embodiment is limited to the segment(s) of the valve distributor tree between the connection openings. These segments are typically cylindrical, so that it is particularly easy to provide a double-walled structure there.

If the at least one stirrer is disposed in the segment of the valve distributor tree delimited by the partial region of the heat exchanger, then this disposition increases the heat transfer coefficient and thereby enhances the intensity of heat transfer in this region.

Using the inventive devices defined in the claims, one can carry out an inventive method of operating these devices, wherein:

liquids from the piping system are passed to a tank or a process aggregate;

liquids from the tank or the process aggregate are passed into the piping system;

the liquids which are being fed or discharged flow through a space which is in fluid communication with the respective contents of the tank or the process aggregate; and the liquid in the space is thermally treated, and/or mixed in place, and/or forcibly circulated through the contents of the tank or the process aggregate, and thereby mixed. The advantages of such a method will be described herein-below, in connection with the devices and exemplary embodiments of same.

BRIEF DESCRIPTION OF THE SEVERAL VIEWS OF THE DRAWINGS

Exemplary embodiments of the device for the piping of process systems according to a first and a second solution, and a "second arrangement variant", as well as a first and second orientation variant according to the invention, are illustrated in the drawings and will be described herein-below as to their structure and functioning.

FIG. 2a is a view of a tank farm system comprised of six tanks, with piping using an inventive device according to the "second solution" and the "first arrangement variant";

FIG. 2b is a bottom view of the tank farm system with piping according to FIG. 2a;

FIGS. 10a-10c are bottom, lateral, and plan views of a special embodiment of a structural segment of the hollow structure, with leak-proof double seat valves disposed on both sides, corresponding to an arrangement according to FIG. 9.

DETAILED DESCRIPTION OF THE INVENTION

Figure 1:
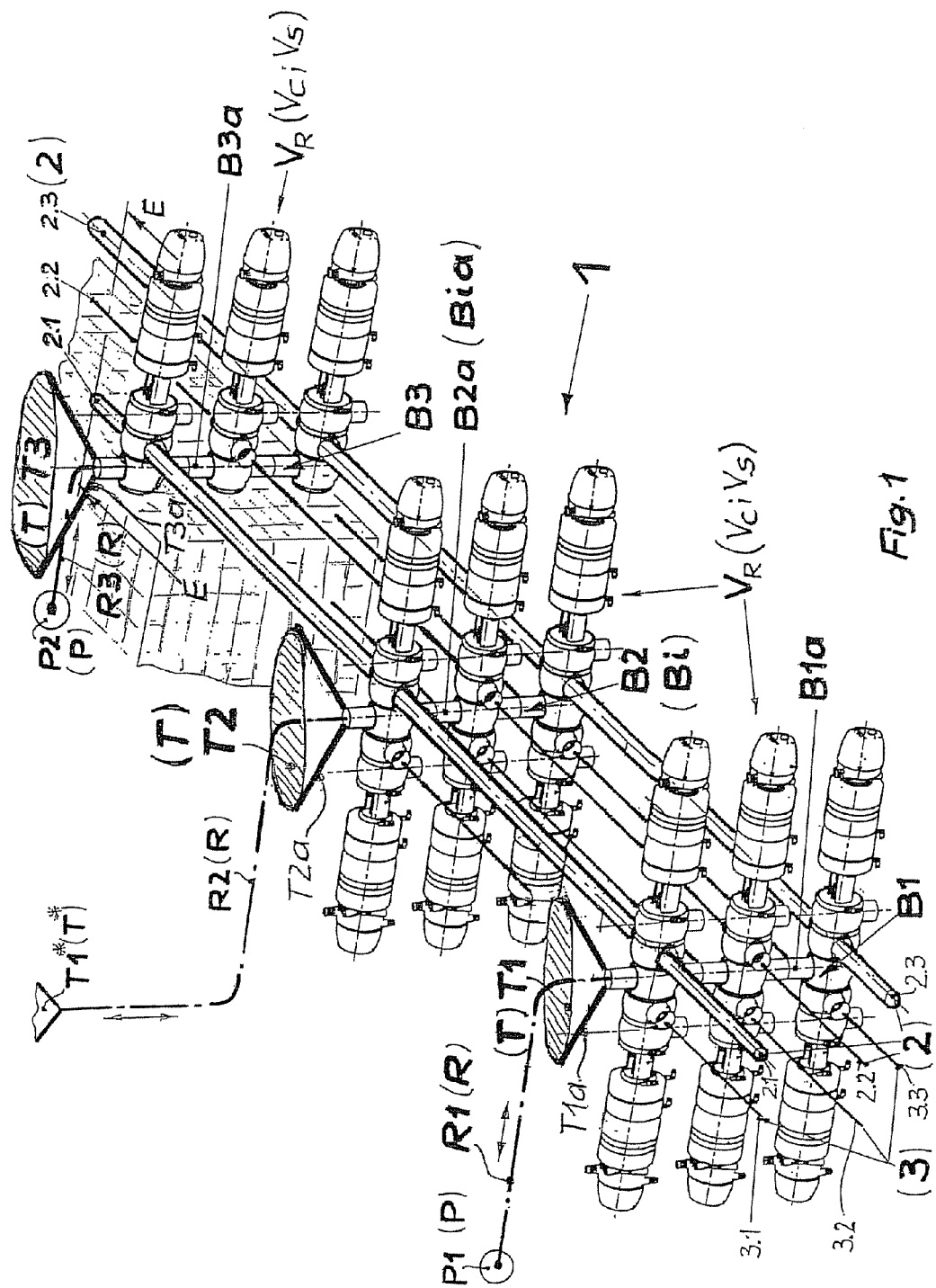
FIG. 1 is a schematic, partially simplified perspective view of a section of an inventive device for the piping of process systems in the context of a first and a second solution with three valve distribution trees in a sequential aligned arrangement, wherewith at the hollow structures of the two forward valve distribution trees on both sides, opposite to each other, in planes which are mutually parallel and are parallel to the longitudinal axis of the hollow structure, the piping systems are passed by and are connected, wherewith the third hollow structure is disposed in front of a wall and is connected on one side to the associated piping system, and wherewith each of the valve distributor trees is either connected directly in/to the lower tank bottom of an associated tank according to a "first arrangement variant" or is connected to an associated process aggregate or tank via an associated pipe connection according to a "second arrangement variant"

While this invention may be embodied in many different forms, there are described in detail herein a specific preferred embodiment of the invention. This description is an exemplification of the principles of the invention and is not intended to limit the invention to the particular embodiment illustrated Whereas the invention is realizable in an enormous variety of configurations, the drawings illustrate particularly preferred embodiments of the "two solutions", the "arrangement variants", and the "orientation variants"; these will be described in more detail herein-below, with the understanding that these are only exemplary embodiments of the invention, but the scope of the invention is not limited to the specially illustrated examples.

DETAILED DESCRIPTION

An exemplary device 1 for piping of process systems is comprised of three valve distributor trees B1, B2 and B3, in the most general case B1 to Bn, which are preferably disposed in rows and are mutually aligned. Each valve distributor tree (B1, B2, B3) (Bi) is in the form of an elongated hollow structure B1a, B2a, B3a (in the most general case B1a to Bna; Bia), preferably a cylindrical tube, which extends generally vertically from below towards the top. The represented device 1 further is comprised of a first piping system 2 which is comprised of a first group of pipelines 2.1, 2.2, 2.3 (in the most general case 2.1 to 2.i to 2.n pipelines), and a second piping system 3 which is comprised of a second group of pipelines 3.1, 3.2, 3.3 (in the most general case 3.1 to 3.i to 3.n pipelines). On the lower end of each valve distributor tree B1 to B3 a third piping system 4 (e.g. for cleaning purposes), not shown, may be connected, if this location is accessible and available (not used for other means).

The first group of pipelines 2.1, 2.2, 2.3 and the second group of pipelines 3.1, 3.2, 3.3 are each disposed in line next to each other, and in relation to the frontmost two valve distributor trees B1, B2 they are on opposite sides of the hollow structures B1a, B2a, in planes which are mutually parallel and are parallel to the longitudinal axes of the said hollow structures and extend past said hollow structures (an anti-mixing valve $V_C$ or $V_R$ or $V_S$ is disposed on each side). The third hollow structure B3a is disposed, e.g., directly in front of a vertical wall, so that at B3a only the first piping system passes by and is connected (an anti-mixing valve $V_C$ or $V_R$ or $V_S$ is disposed only on one side).

Figure 6:
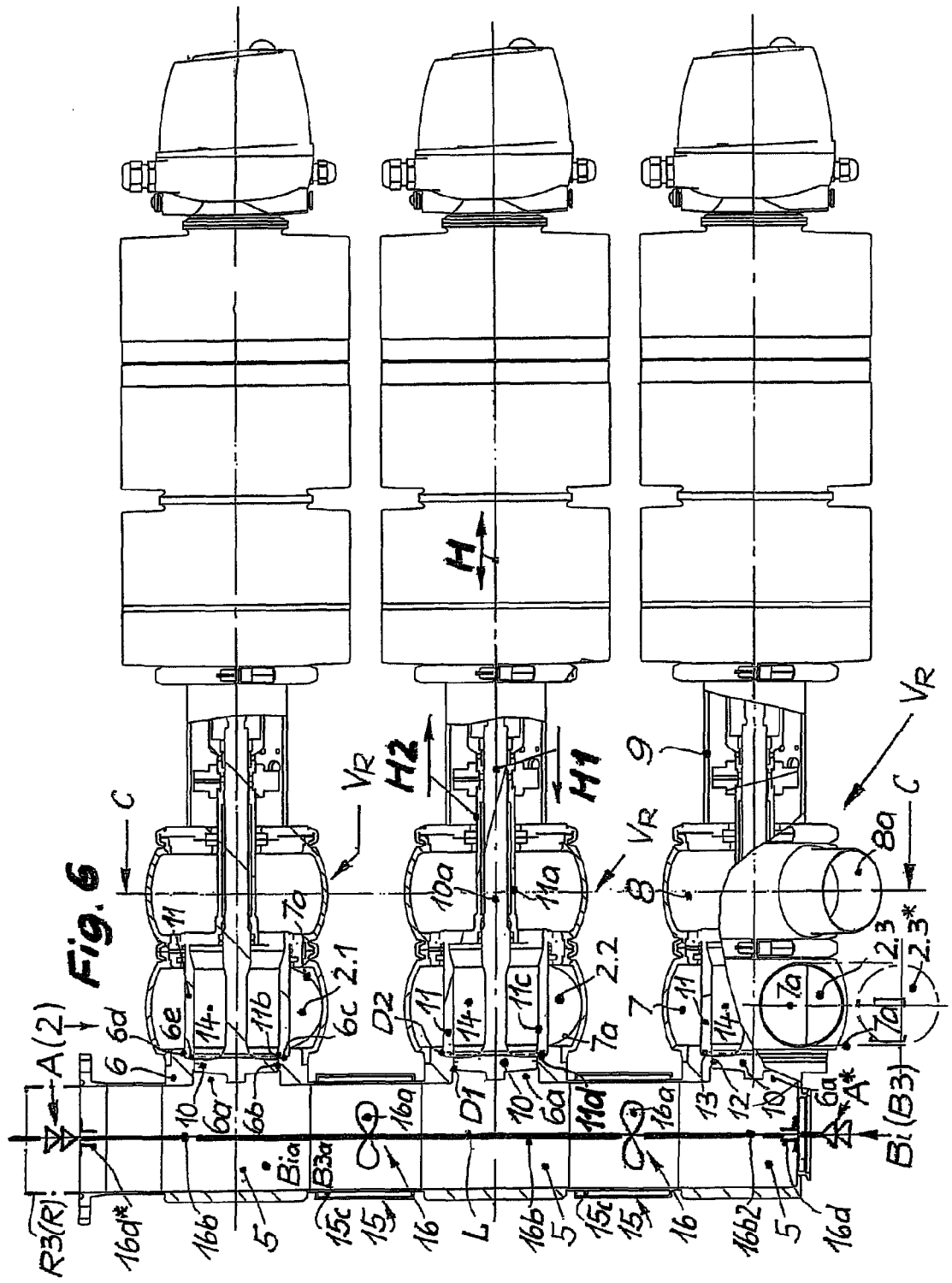
FIG. 6 is a middle cross sectional view through the lower valve distributor tree according to FIG. 1, through line E-E therein, wherewith corresponding middle cross sectional views of other valve distributor trees with similar components (not shown) will lead to similar illustrations, and wherewith the device shown is an inventive device according to the "second solution" and the "second arrangement variant", with anti-mixing double seat valves connected on one side to the valve distributor tree.

A cross section through the middle at a location corresponding essentially to that of the valve distributor tree B3 is illustrated in FIG. 6. The hollow structure B1a, B2a, B3a has connecting openings 6a (see exemplary embodiment according to FIGS. 3 and 6) for connecting its interior space with each of the pipelines 2.1, 2.2, . . . , 2.i, . . . , 2.n and 3.1, 3.2, . . . , 3.1, . . . , 3.n and possibly 4. In each of these connections the valve $V_C$ or $V_R$ or $V_S$ having an anti-mixing configuration is disposed, which valve switches this connection in direct proximity to the hollow structure B1a, B2a, B3a. In the device illustrated in FIG. 1, double-seat valves $V_R$ are employed; double-seal valves $V_C$, which are also suitable, essentially do not differ from double-seat valves in their external appearance. With the use of leak-proof disk valves $V_S$, there is another phenomenon, not shown, with respect to the drive and the leakage- and outflow housing for the switching leakage and the cleaning agent from the cleaning of the leakage space, because the drive employed is disposed perpendicularly to the axis of symmetry of the associated connecting opening 6a, and the switching leakage and the cleaning agent as a rule are passed directly from the leakage and outflow housing into the surroundings. The configuration and course of the piping systems 2, 3, and possibly 4 are essentially independent of the type of anti-mixing valve ($V_C$, $V_R$, or $V_S$).

As shown in FIG. 1, each valve distributor tree (B1 to B3) (in the most general case B1 to Bi to Bn) opens out directly into the lower tank bottom T1a to T3a (in the most general case T1a to Tia to Tna) of a corresponding tank T1 to T3 (Tank T; in the most general case T1 to Ti to Tn) of the process system ("first arrangement variant"); or it is connected via an associated pipe connection R (R1 to R3; in the most general case R1 to Ri to Rn) to an associated process aggregate P (P1, P2; in the most general case P1 to Pi to Pn) or to tank T1*; (tank T*; in the most general case T1* to Ti* to Tn*) of the process system, and the pipe connection R (R1 to R3) (in the most general case R1 to Ri to Rn) opens out into the upper end of the valve distributor tree B1 to B3 (B1 to Bi to Bn) ("second arrangement variant"). The two fundamental arrangement variants mentioned above can also occur in a single device 1 (mixed form).

In the second arrangement variant, the upper end of the first valve distributor tree is connected via a first pipe connection R1 with, e.g., a first process aggregate P1; the second valve distributor tree B2 is connected via a second pipe connection R2 to a first tank T1*; and the third valve distributor tree B3 is connected via a third pipe connection R3 to a second process aggregate P2. The pipe connections R1, R2 and R3 are in the most general case designated R, which can have an index i=1 to n pipe connections.

In the second arrangement variant, the process aggregates P or the tanks T* may have any configuration and positioning, whereas the valve distributor trees B1 to Bn preferably are configured in rows or matrices. In the pipe connections R1 to R3 (R1 to Rn) shown, the end section connected to the valve distributor trees B1 to B3 (B1 to Bn) may be perpendicular or may be inclined in any manner. Such an inclined end section, which in the limiting case is horizontal, is connected to a corresponding pipe elbow at the upper end of the respective valve distributor tree B1 to B3 (B1 to Bn).

Figure 2:
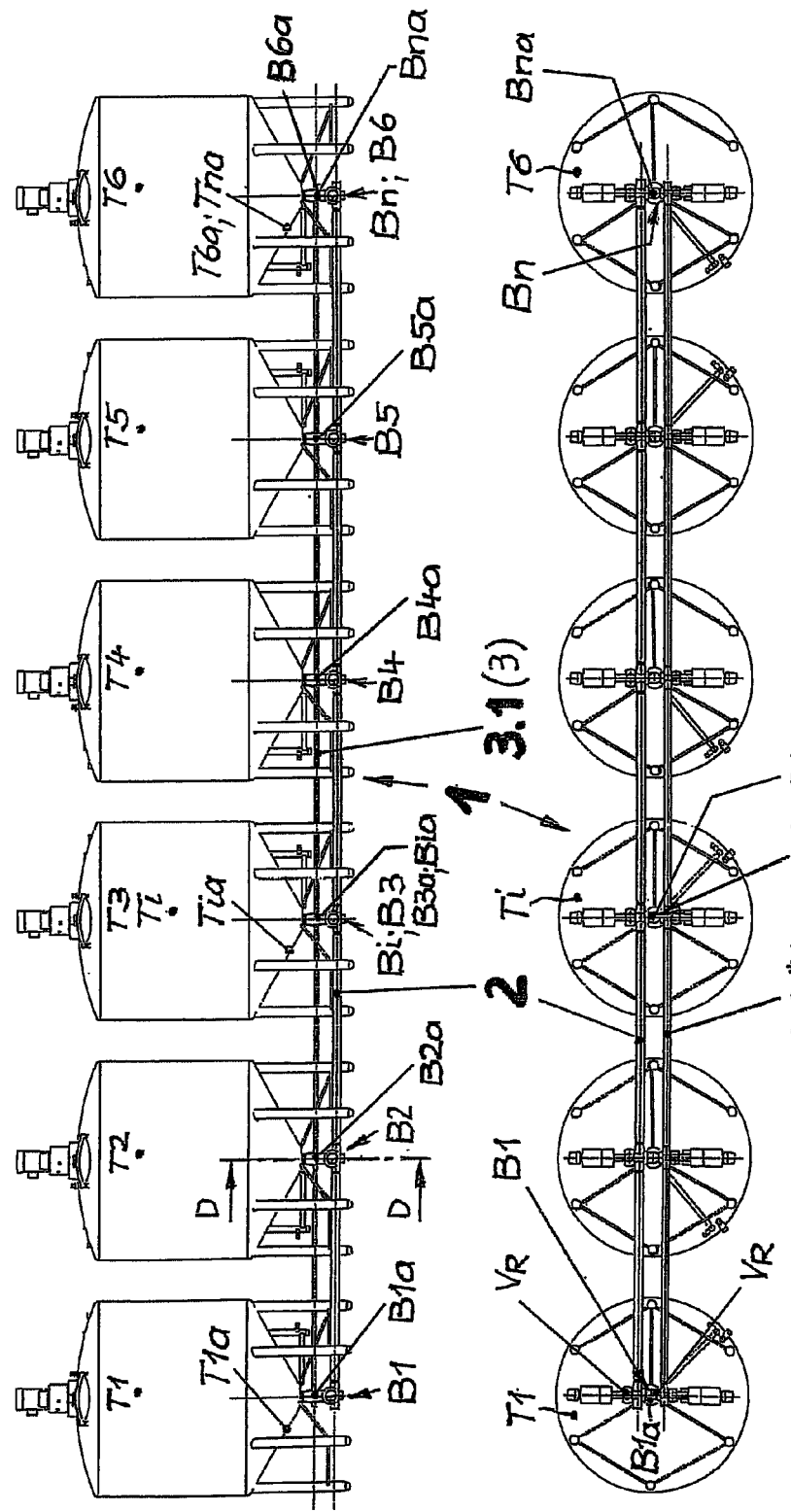

FIGS. 2a and 2b illustrate another exemplary embodiment of the device 1 for the abovementioned first arrangement variant, wherein, in a tank storage system comprised of six tanks T1 to T6 (in the most general case T1 to Ti to Tn), the respective valve distributor tree B1 to B6 (B1 to Bi to Bn) opens out directly into the lower tank bottom (T1a to T6a) (T1a to Tia to Tna) of the respective tank T1 to T6 (FIG. 2a). Double seat valves $V_R$ are disposed on both sides of each hollow structure B1a to B6a (B1a to Bia to Bna) (FIG. 2b), which valves switch a pipeline 3.1 (e.g. for filling the tank) and a piggable pipeline 3.2*(e.g. for emptying the tank) in a second piping system 3, and a pipeline 2 in a first piping system (e.g. a return line for the CIP cleaning of the tank and other apparatuses).

Figure 3:
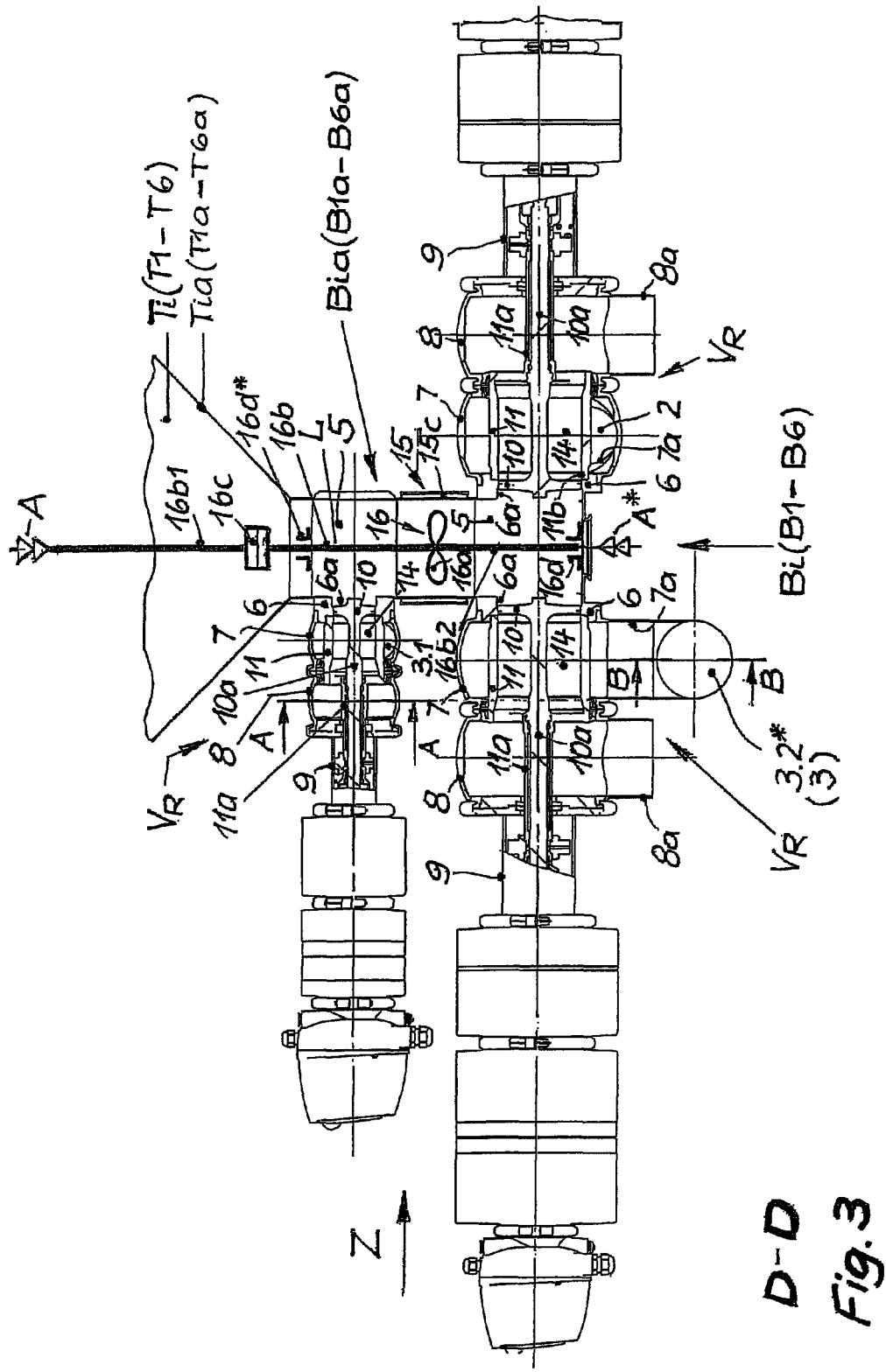
FIG. 3 is a middle cross sectional view through a valve distributor tree on the second tank of a tank farm system according to FIG. 2a, with the cross section being through line D-D of FIG. 2a corresponding middle cross sectional views of the other valve distributor trees in the present exemplary embodiment, having similarly disposed components, will lead to similar illustrations.
Figure 4:
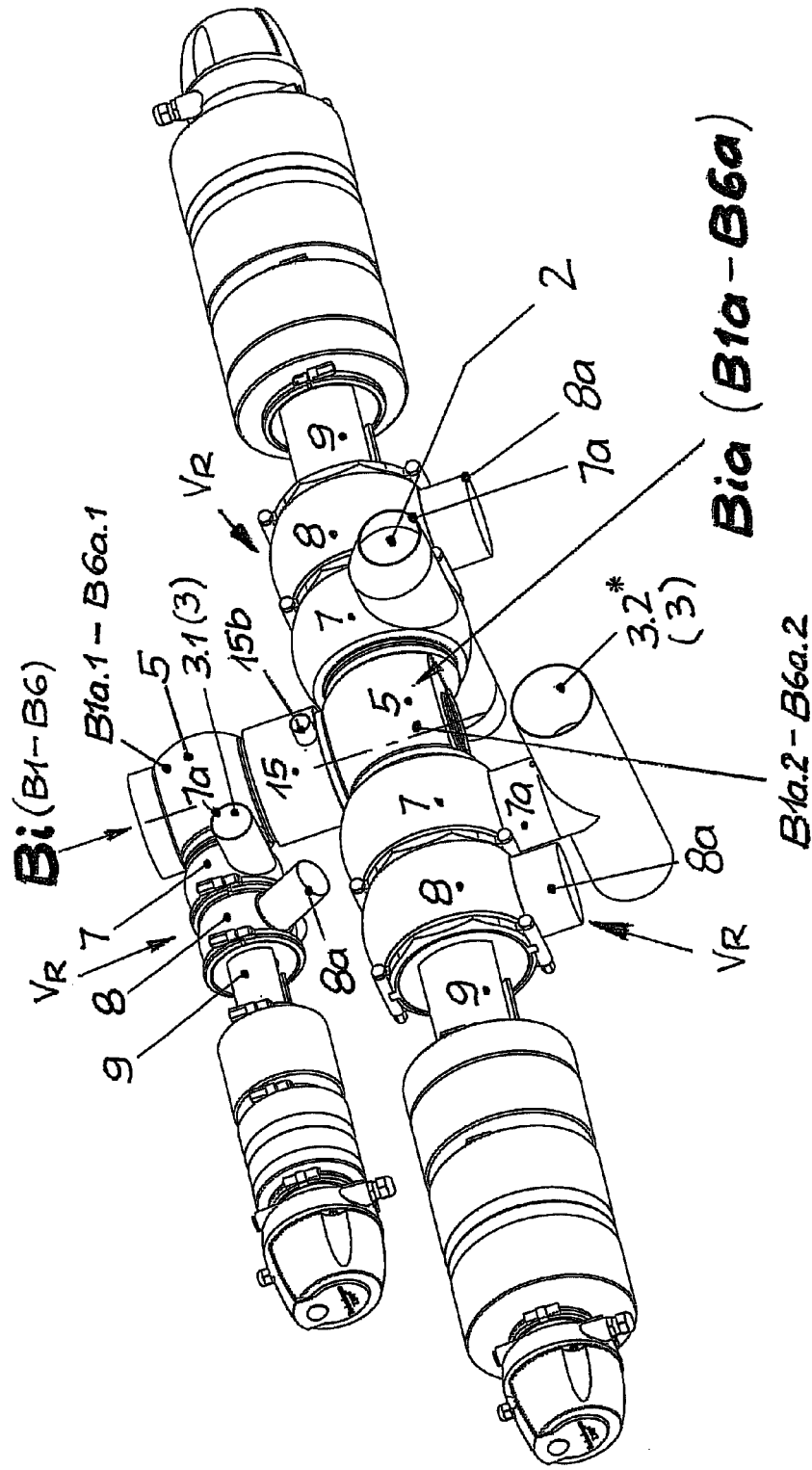
FIG. 4 is a perspective view of the valve distributor tree according to FIG. 3 with anti-mixing double seat valves connected on both sides.
Figure 5:
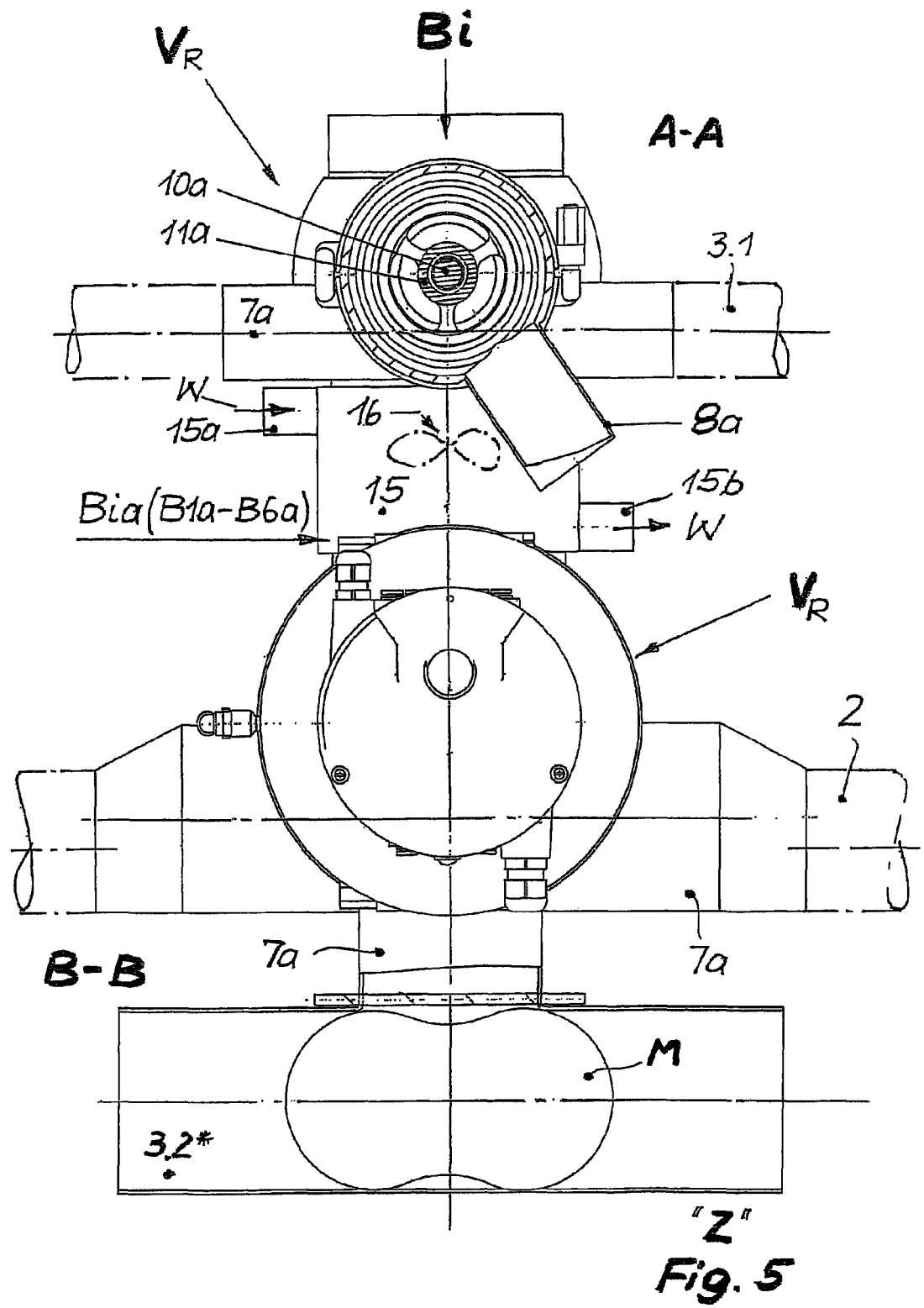
FIG. 5 is a view of the valve distributor tree according to FIG. 3 in the direction Z indicated therein, wherewith the upper double seat valve is shown in a cross section through line A-A of FIG. 3, and the piggable pipeline on the lower end of the valve distributor tree is shown in a cross section through line B-B of FIG. 3.

FIGS. 3 to 5 show that the hollow structures B1a to B6a (in the most general case Bia) in the context of the device 1 according to FIGS. 2a and 2b may be constructed of two segments 5, wherewith each structural segment 5 is in the form of a ring-shaped housing 6 in the region around its connecting openings 6a (FIG. 3), which housing has interiorly (see in particular FIG. 6, at the upper structural segment 5) a first seating surface 6b, a second seating surface 6c, and a cylindrical recess 6d. The ring-shaped housing 6 of the lower structural segment 5 is connected to a valve housing 7 of a double-seat valve $V_R$ on each side, which valve extends transversely to the longitudinal direction of the structural segment 5 (FIGS. 3 and 4), wherewith the pipeline 2 of the first piping system extends to the pipe connection 7a (right side) of said housing 7. It is provided in this exemplary embodiment that the pipe connection 7a on the valve housing 7, with reference to the configuration, has its lowest interior peripheral wall line extending tangentially into the lowest point of the interior space of the valve housing 7 (FIGS. 4 and 5).

The valve housing 7 disposed on the left side of the lower structural segment 5 (FIGS. 3, 4, and 5) opens out via a vertically downwardly oriented pipe connection 7a into the piggable second pipeline 3.2* from the second group of pipelines of the second piping system 3. This pipeline 3.2* in the entirety of its extent has an unobstructed circular cross section, wherewith it is penetrable by a pig device M, e.g. a double-sphere pig device (FIG. 5); it passes by the associated valve housing 7 of the anti-mixing double-seat valve $V_R$ and is in fluid communication with said valve. In principle, each of the pipelines 2.1 to 2.n of the first group of pipelines of the first piping system 2, and each of the pipelines 3.1 to 3.n of the second pipeline group of the second pipeline system 3, and possibly also the third piping system 4, is designed to be piggable in the manner described. This leads to the piggable pipelines 2.1* to 2.n* (2.3*, see FIG. 6), the piggable pipelines 3.1* to 3.n* (3.2*, see FIG. 3), and possibly a piggable third piping system 4*.

On the upper structural segment 5 (FIGS. 3 and 4) a valve housing 7 of a second double-seat valve $V_R$ is disposed, on only the left side; the first pipeline 3.1 from the second group of pipelines of the second piping system 3 leads to the pipe connection 7a of said valve. In this exemplary embodiment it is provided that the pipe connection 7a on the valve housing 7, with reference to the configuration, has its lowest interior peripheral wall line extending tangentially into the lowest point of the interior space of the valve housing 7 (FIGS. 4 and 5).

The respective valve housing 7 is part of the mix-proof double seat valve $V_R$. A leakage and discharge housing 8 connects laterally to the valve housing 7, in the longitudinal direction of the double-seat valve $V_R$, which housing has a diskcharge connection 8a and a drive (not shown in detail) which connects to the leakage and discharge housing 8 via a "lantern housing" 9.

The double-seat valve $V_R$ has two serially disposed closing members 10, 11 (FIGS. 3 and 6), which in the closed position of the valve prevent the flow of fluids from the hollow structure Bia and the structural segment 5 into the valve housing 7. In both the closed and the open position, the closing members 10, 11 border a leakage space 14 which has at least one communication path with the surroundings of the double-seat valve $V_R$. In the exemplary embodiment shown, the interior space of the leakage and discharge housing 8 and its discharge connection 8a are part of this communication path. The first closing member 10 is connected to a first valve rod 10a, and the second closing member 11 is connected to a second valve rod 11a; these valve rods are concentrically disposed, and on one side they extend through the valve housing 7 and from there they extend via the leakage and discharge housing 8 to the drive.

The structural segment 5 with the ring-shaped housings 6 on both sides or with one housing 6 on one side is of unit construction, and the valve housing 7 has associated with it on its outer side the ring-shaped housing 6, with which housing 7 is firmly connected by integral joining, preferably welding. The connection opening 6a (see in particular FIG. 6, upper structural segment 5) forms, with its peripheral border, the cylindrical first seat surface 6b for the first closing member 10. The pipe connections 7a are, as described above, connected such that they are preferably disposed tangentially to the valve housing 7, up to their connections with the piggable pipelines 2.1* to 2.n* and 3.1* to 3.n* and possibly 4*. The valve housing 7 has at its end facing the leakage and discharge housing 8 a clamping flange (not shown) via which it is releasably connected to said housing 8 by means of a clamping ring (also not shown).

FIGS. 3 and 6 show additional details of the anti-mixing double-seat valve $V_R$. Starting from the above-described features of the valves, one should add the fact that the first closing member 10 is independently driven and that in its opening movement it comes to abut against the second closing member 11, which is configured as a seat disk, and carries member 11 into the open position as well. The second closing member 11 is in the form of a hollow rod which on its end directed toward the first closing member 10 has an axially acting second seat seal 13 (FIG. 6, lower structural segment 5), which seal cooperates with the second seat surface 6c adjoining the cylindrical first seat surface 6b. The first closing member 10, which is in the form of a sliding plunger, has a radially acting first seat seal 12 which in the closed position of the valve is sealingly accommodated in the first seating surface 6b. The cylindrical first seat 6b is formed in the peripheral wall delimiting the connector opening 6a.

The second closing member 11, in the form of a hollow rod, has on the inner side of its end region which bears the second seat seal 13 a cylindrical accommodating bore 11b (FIGS. 6 and 3) which has the same diameter as the cylindrical first seat surface 6b. In the closed position of the second closing member 11, the accommodating bore 11b and the first seat 6b have moved flush against each other, so that a leak-free switching is brought about, with only two seat seals 12, 13.

The double-seat valve $V_R$ is subjected to a seat cleaning (FIG. 6, middle double-seat valve $V_R$) by means of a partial stroke (H1, H2) of its closing members 10, 11. The seat cleaning of the first closing member 10 occurs by the opening movement with the first partial stroke H1 which is in the opposite direction to the opening stroke H, and the seat cleaning of the second closing member 11 occurs through the second partial stroke H2 which is in the same direction as the opening stroke H; during these strokes, the other closing member 11, 10 remains in its closed position. In the respective seat cleaning position, a first choke gap D1 on the leakage space side is formed at the first closing member 10, and a second choke gap D2 is formed at the second closing member 11 on the side facing away from the leakage space. The first choke gap D1 is delimited on one side by the external diameter of the first closing member 10 (a sliding plunger) and on the other side by the cylindrical first seat surface 6b, and the second choke gap D2 is delimited on one side by an external wall surface of the second closing member 11 which is in the form of a hollow rod and on the other side by the cylindrical recess 6d in the ring-shaped housing 6.

In the closed position of the second closing member 11, which position is also assumed when the closing member 10 is in its seat-cleaning position, the second closing member 11 has available, with a closing-member-side detent surface 11d (see FIG. 6, middle structural segment 5), a metallic detent on the second seat surface 6c, wherewith a seat-surface-side detent surface 6e associated with the closing-member-side detent surface 11d directly borders the first seat surface 6b (FIG. 6, upper structural segment 5). With this arrangement, in addition to the already optimal arrangement geometry of the seat surfaces with respect to each other, the seat region of the second closing member 11, in the course of seat cleaning of the first closing member 10, is very effectively protected against direct exposure to the seat cleaning flow. A direct impact of the seat cleaning flow on the seat region of the first closing member 10 in the course of seat cleaning of the second closing member 11 is also excluded, because the associated seat cleaning flow enters crosswise to the first seat surface 6b and enters collision-free into the leakage cavity 14 with an offset from the adjacent end section of the first closing member 10 and its first seat seal 12.

The second closing member 11 (in the form of a hollow rod) is cylindrical on its outer wall surface, and opens out into the leakage and discharge housing 8 (FIGS. 3 and 6), which housing 8 is joined to the valve housing 7 at the side of said housing 7 which is directed away from the ring-shaped housing 6, by means of a clamping flange (not shown). This releasable joining employs a compression ring (not shown). The external wall surface of the second closing member 11 is passed in the joining region between the valve housing 7 and the leakage and discharge housing 8, and is sealed there. The details of this will not be described here.

In the region of the interior space of the leakage and discharge housing 8, the second closing member 11 undergoes a transition to a second valve rod 11a, of smaller diameter, and there is provided a fluid-permeable connection between the second closing member 11 and the second valve rod 11a, via at least one essentially radially oriented traverse (not shown). The valve rods (10a, 11a) are passed through and out of the side of the leakage and discharge housing 8 which is directed away from the valve housing 7, where they pass axially through the "lantern housing" 9 and farther to a drive means for the valve (not shown). The leakage space 14 is connected to the interior of the leakage and discharge housing 8, via a discharge bore which is delimited by an inner peripheral wall 11c of the second closing member 11 (FIG. 6), which [housing 8] opens out into the discharge connection 8a. On the side of the "lantern housing", the leakage and discharge housing 8 is closed off by a cover piece (not shown) which is sealingly passed through by the second valve rod 11a.

In the valve distributor tree B1 to B6 (Bi) (FIG. 3) or Bi (B3) (FIG. 6) there is a stirrer shaft 16b along the longitudinal axis L, which shaft bears at least one stirrer 16a of a stirring device 16. The stirrer shaft 16b is basically driven by a first drive A from above or by a second drive A* from below. The stirrer shaft 16b can be rotatably mounted on its end directed away from the first drive A or the second drive A* in a lower bearing 16d or an upper bearing 16d*, in the associated end of the valve distributor tree B1 to B6, or Bi (B3).

In the first exemplary embodiment shown (FIG. 3), the first drive A is derived from a stirring device (not shown) in the respective tank T1 to T6 (Ti), and the stirrer shaft 16b is connected with the upper stirrer shaft 16b1, in alignment, via a coupling 16c, wherewith the stirrer shaft 16b1 forms a prolongation of the stirrer shaft of the stirring device in the tank (T1 to T6). The stirrer shaft 16b is prolonged downward via the shaft 16a into a lower stirrer shaft 16b2, and the latter is additionally rotatably mounted in the lower bearing 16d on the lower end of the valve distributor tree (B1 to B6). The at least one stirrer 16a is preferably disposed in a region of the valve distributor tree (B1 to B6) between the connection openings 6a.

In the second exemplary embodiment shown (FIG. 6), wherein a third pipeline R3 (R) opens out into the valve distributor tree Bi (B3) from above, the stirrer shaft 16b is basically driven from above by the first drive A or in a simpler manner from below by the second drive A*. The stirrer shaft bears, e.g., two stirrers 16a, each of which is preferably disposed in a region of the valve distributor tree Bi (B3) between the connection openings 6a. The stirrer shaft 16b is additionally rotatably mounted in the lower bearing 16d or the upper bearing 16d*, at its (shaft 16b's) end directed away from the first drive A or the second drive A*, in the associated end of the valve distributor tree Bi (B3). The description of FIG. 3 applies to this, analogously.

Figure 7:
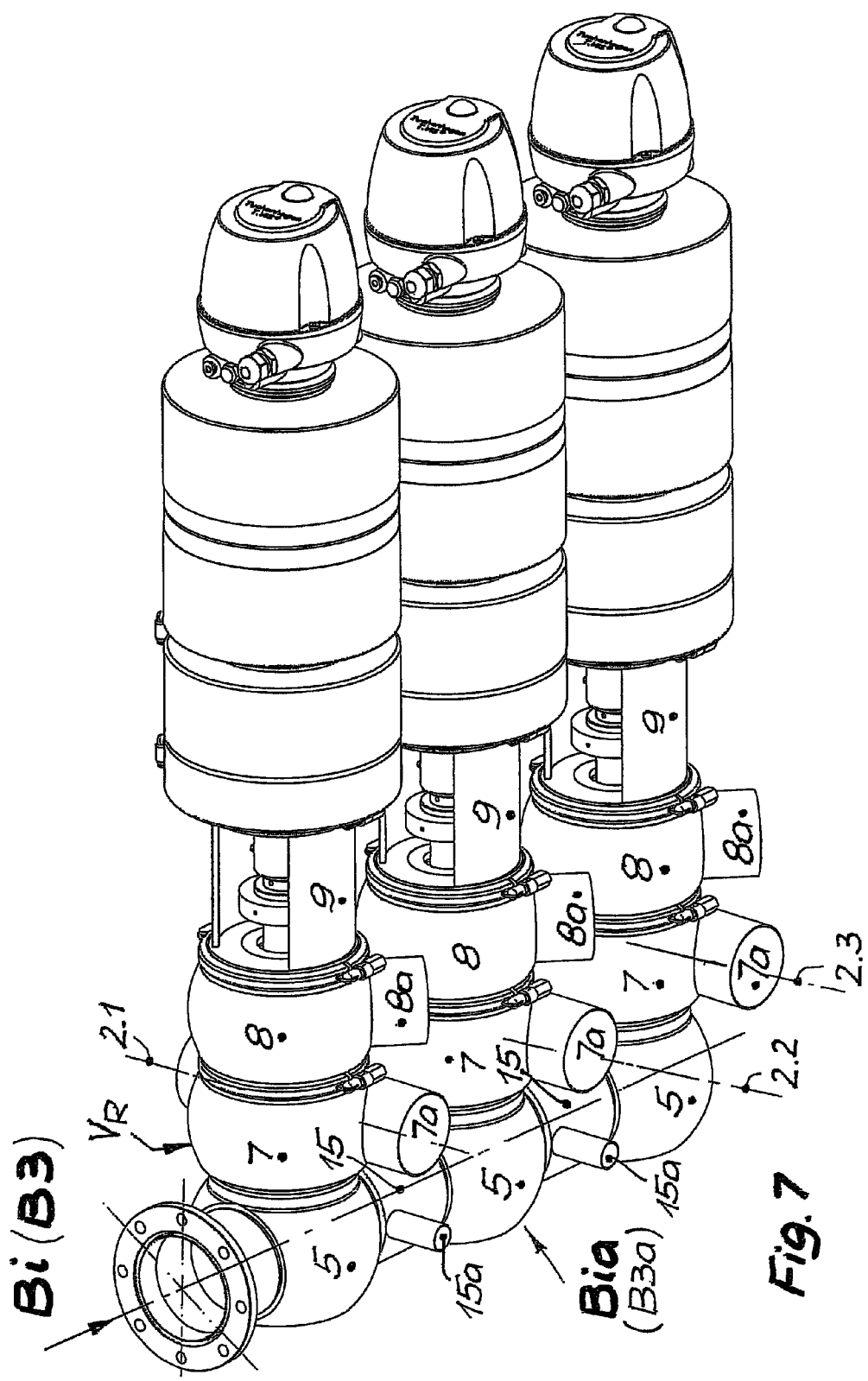
FIG. 7 is a perspective view of the device according to FIG. 6.
Figure 8:
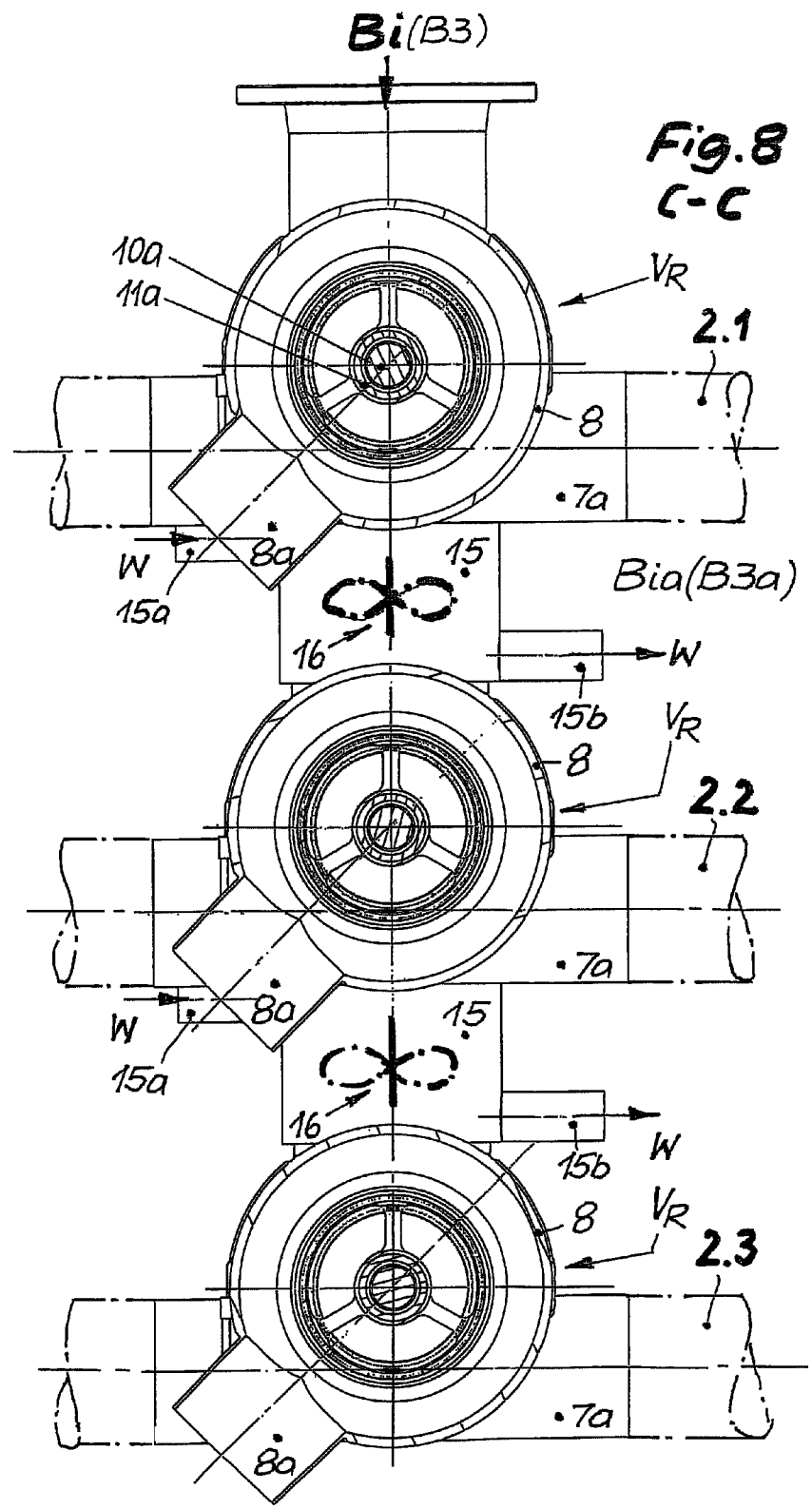
FIG. 8 is a cross section through the valve distributor tree according to FIG. 6, namely through line C-C therein.

The configuration of the valve distributor tree Bi (B3) in connection with the anti-mixing valves, particularly the double-seat valve $V_R$, corresponding to the "second arrangement variant" in the context of the "second solution" (FIGS. 6 to 8), is adequate for the above-described first arrangement variant in the context of the "second solution" (FIGS. 3 to 5). Therefore the analogous features will not be re-described here. The three double-seat valves $V_R$ switch the first group of pipelines (2.1, 2.2, 2.3) of the first piping system 2. In a piggable version of these pipelines, a given pipeline, as alternately illustrated on the lower valve housing 7 by the pipeline 2.3*(FIG. 6), is passed by [(through)] the given valve housing 7, wherewith a pipe connection (7a), which now no longer tangentially opens out from the valve housing 7, serves for a fluid-accessible connection between the valve housing 7 and the piggable pipeline 2.3*. The arrangement of a stirring device 16 with at least one stirrer 16a has been described, above.

In both the above-described "first solution" (FIGS. 1 to 5) and the above-described "second solution" (FIGS. 1 and 6 to 8) a given valve distributor tree Bi can be exposed to a heat transfer medium W for recuperative purposes. In this connection, the valve distributor tree (FIGS. 1 to 8) has double walls, in its entirety or in certain regions, wherewith the intermediate space(s) 15c which forms/form a heat exchanger 15 is/are connected with an associated feed and discharge connection (15a, 15b) for the heat transfer medium W (see in particular FIGS. 4-5 and 7-8).

To simplify the device 1, the abovementioned certain regions of double wall structure, as illustrated generally in FIGS. 3 to 8, are present on the region(s) of the valve distributor tree Bi between the connection openings 6a.

If the at least one stirrer 16a is disposed in the region of the valve distributor tree Bi delimited by the limited region of the heat exchanger 15, as illustrated in FIGS. 3 and 6, then this arrangement increases the heat transfer coefficient and thereby enhances the intensity of heat transfer in this region.

The illustrated horizontal arrangement of the double-seat valve $V_R$, which may also be true of the two other anti-mixing double-seat valves $V_C$ and/or $V_S$, is the preferred arrangement, which is made possible by the fact that as a result of the above-described design of the valve itself, in this orientation self-emptying of the leakage space 14 is possible without formation of pools. In the most general case, the double-seat valve $V_R$ slopes in the direction of gravity and is arranged at the given hollow structure Bia, wherewith, in relation to the configuration, the longitudinal axis of the valve housing is either horizontal or, viewed from the connection opening 6a, is sloped at an angle to the horizontal, and the inner peripheral wall 11c of the leakage space 14 is sloped in the direction of gravity toward the outlet opening of it (said space 14).

The hollow structure B1a to Bna may comprise an aggregation of a number of individual structural segments 5 (see FIGS. 3 to 8), which are interconnected so as to allow passage of fluid, namely they are interconnected in the direction of the longitudinal axis L of the valve distributor tree (B1 to Bn), wherewith each segment 5 has at least one connection opening 6a. The structural segments 5 may be in the form of housing parts B1a.1 and B1a.2, to B6a.1 and B6a.2 (in the most general case, housing parts Bia.1 to Bia.m; FIG. 4) with different sizes, wherewith, e.g., a given connection opening 6a may have a flow-through cross section which depends on the size of the associated structural segment 5. In the case of more than one connection opening 6a on a given structural segment 5, if necessary the flow-through cross sections of the connection openings 6a may be of different sizes.

The valve distributor tree B1 (generally Bi) extends transversally in the present case, horizontally below a tank T1 (generally T), of which only the lower tank bottom T1a (generally Tia) is shown; or below a process aggregate P1 (generally P) (FIG. 9), where the depth of the available installation space is not substantial; the said tree B1 is connected to the lower tank bottom of the tank T or the process aggregate P by an associated first circulation line segment U1.1 (generally Ux.1). The first circulation line segment Ux.1 opens out into the tank-side or process-aggregate-side end of the valve distributor tree B1 (Bi). At the hollow structure B1a (Bia) of the valve distributor tree B1 (Bi) a maximum number n of structural segments are disposed (of which only two are shown). Both sides of the respective structural segment 5 are adjoined by the leak-proof valves $V_R$, $V_C$, or even $V_S$, in the manner described above, wherewith in the exemplary embodiment leak-proof double-seat valves $V_R$ are employed. Each of these is comprised of a valve housing 7 with a pipe connection or two pipe connections 7a, a leakage and discharge housing 8 with discharge connection 8a, and a "lantern housing" 9 and adjoining drive.

The tank farm may be comprised of a number n of tanks (T1 to Tn), or the process aggregate may be comprised of a number n of process aggregates (P1 to Pn), which, as in the exemplary embodiment, are preferably disposed in a row, or they may be disposed in a matrix. An important feature is that, because of the small vertical space available under the tanks T or the process aggregates P, the valve distributor tree Bi (B1 to Bn) associated with a given tank T or process aggregated P extends perpendicular to it (in the typical case, horizontally).

A first group of pipelines 2.1 to 2.n and a second group of pipelines 3.1 to 3.n, which form the piping system (2, 3), are disposed in mutually parallel planes next to each other (not shown), and in the typical case they extend past the hollow structure B1a (Bia) on one side or on opposite sides of said structure, in planes which intersect the longitudinal axis of said hollow structure B1a (Bia). In the exemplary embodiment, only the sources of the pipelines 2.1, 2.1 and 3.1, 3.2, starting from the respective valve housing 7 with its pipe connections 7a, are shown.

The first circulation line segment Ux.1 (U1.1 to Un.1, generally Ui.1), which has the hollow structure Bia (B1a to Bna) as an integral component, is a part of a circulation line U (U1 to Un, generally Ui) which passes through the tank T or the process aggregate P, wherewith this (segment Ux.1) returns to the tank T or the process aggregate P via a third circulation line segment Ux.3 (U1.3 to Un.3, generally Ui.3) in which an advancing device 20, preferably a rotary pump, is disposed. If necessary, a second circulation line segment Ux.2 (U1.2 to Un.2, generally Ui.2) bridges over at least the hollow structure Bia (B1a to Bna), as a bypass line to the first circulation line segment Ux.1 (U1.1 to Un.1), and merges with said segment Ux.1 on both sides. The second and third circulation line segments (Ux.2, Ux.3) form a parallel circulation line U* (U1* to Un*, generally Ui*) to the circulation line U (U1 to Un). The first circulation line segment Ux.1 can be shut off on the tank side or the process aggregate side by a first shutoff valve 21, and the second circulation line segment Ux.2 can similarly be shut off by a second shutoff valve 22.

The disposition of the circulation line U (U1 to Un) and the parallel circulation line U* (U1* to Un*) is not limited to a tank T or a process aggregate P connected to the essentially horizontal valve distributor tree Bi. Rather, this piping principle is practicably adaptable for both of the above-described "solutions", "arrangement variants", and "orientation variants", in their application to tanks (T, T*) and process aggregates P, wherein the valve distributor tree is essentially vertical and is connected there directly or via a pipeline. With the aid of the circulation lines (U, U*) a similarity of the technological conditions and condition parameters in the hollow structure Bia and in the tank T, T*, T or process aggregate P, P is achieved, i.e., e.g. by circulation pumping one prevents heating of the liquid (product) in the pipeline system, if it is desired to have the local temperature at a value below room temperature. Otherwise, there remains the option also proposed according to the invention of heating the liquid (product) in the region of the valve distributor tree Bi by recuperative heating with a heat transfer medium W.

Figure 9:
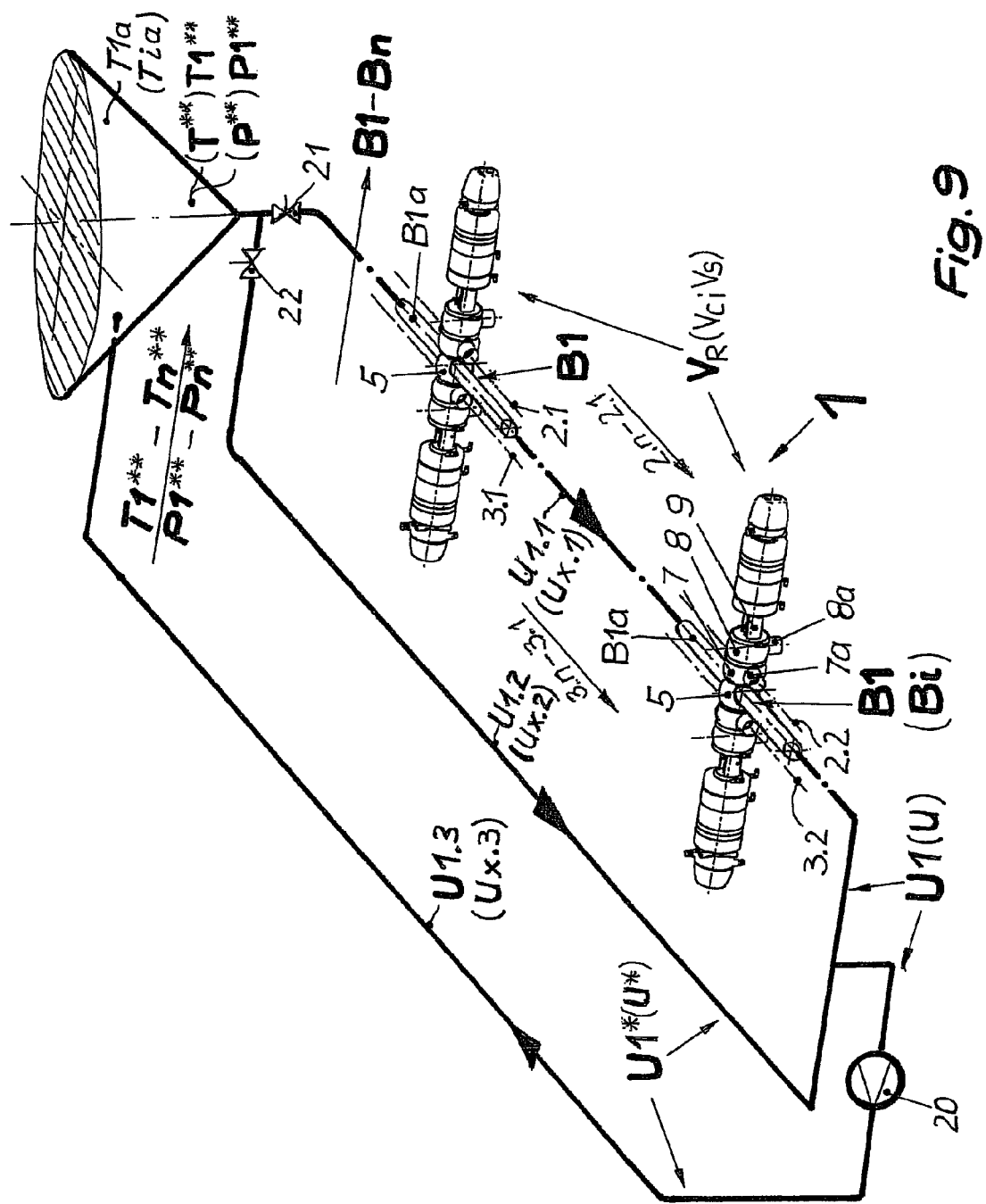
FIG. 9 is a schematic, partially simplified, perspective view of an inventive device for piping of process systems in the context of a "first solution" and a "second solution", with a valve distributor tree in a horizontal arrangement (second "orientation variant" of the "first arrangement variant"), wherewith a first group of pipelines and a second group of pipelines, said groups being on opposite sides of the hollow structure, are brought up to the associated connection openings, and are disposed side by side in mutually parallel planes (planar configuration not shown), and are passed by on one side (or opposite sides) of the hollow structure in planes which intersect the longitudinal axis of the hollow structure, and wherewith, inter alia, the circulation line with a first circulation line segment which includes the hollow structure as an integral component is connected to the tank or the process aggregate.

FIGS. 10a to 10c illustrate an advantageous embodiment of the structural segment 5, of which the hollow structure B1a (Bia) of the valve distributor tree B1 (Bi) is comprised, with mutually aligned leak-proof double-seat valves $V_R$ on both sides, as preferably is employed in the horizontally oriented valve distributor tree B1 (Bi) according to FIG. 9. In order to avoid pooling of the liquid, so that complete removal of residues can be achieved, the pipe connection 7a is tangentially disposed in the lower region of the valve housing 7. The hollow structure B1a (Bia), which in every case is an integral part of the circulation line segment U1.1 (Ui.1) and comprises a pipeline segment with a circular cross section, opens out into the upper region of the structural segment 5 in such a way that, avoiding a space in the structural segment 5 below the hollow structure B1a (Bia) which space would be subject to pool formation, one provides for residue-free outflow of the liquid from the latter into the valve housing 8, which housing is joined on both sides.

It may be seen from the preceding that various modifications and variations of the device for the piping of process systems in the food and beverage industry may be realized, without departing from the essence and the novel conceptualization of the present invention. It is to be understood that the particular embodiments illustrated here are not intended to limit the scope of the invention. The discloaure is intended to encompass all variants and refinements which are within the scope of protection of the claims.

LIST OF REFERENCE SYMBOLS

FIGS. 1 to 8
1 Device (for piping of process systems).
2 first piping system.
2.1, 2.2, ..., 2.n first group of pipelines.
2.i a pipeline in the first group.
2.1 first pipeline in the first group.
2.2 second pipeline in the first group.
2.1*-2.3*-2.n* piggable pipelines from the first group.
3 second piping system (e.g. for emptying).
3.1, 3.2, ..., 3.n second group of pipelines.
3.i a pipeline in the second group.
3.1 first pipeline in the second group.
3.2 second pipeline in the second group.

3.1*-3.2*-3.n* piggable pipelines from the second group.
(4) third piping system (e.g. for cleaning).
(4*) piggable pipelines from the third piping system.
5 structural segment.
6 ring-shaped housing.
6a connection opening.
6b first seat surface.
6c second seat surface.
6d cylindrical recess.
6e seat-surface-side detent surface.
7 valve housing.
7a pipe connection.
8 leakage and discharge housing.
8a discharge connection.
9 "lantern housing".
10 first closing member (sliding plunger).
10a first valve rod.
11 second closing member (seat disk).
11a second valve rod (hollow rod).
11b cylindrical accommodation bore.
11c inner peripheral wall.
11d closing-member-side detent surface (radially interior).
12 first seat seal.
13 second seat seal.
14 leakage space.
15 heat exchanger.
15a feed connection.
15b discharge connection.
15c intermediate space.
16 stirring device.
16a stirrer.
16b stirrer shaft.
16b1 upper stirrer shaft.
16b2 lower stirrer shaft.
16c coupling.
16d lower bearing.
16d* upper bearing.
A first drive of the stirring device.
A* second drive of the stirring device.
B1 bis Bn valve distributor tree.
Bi one of the valve distributor trees B1 to Bn.
B1a bis Bna hollow structure.
Bia hollow structure (B1a to Bna) associated with the pipeline Ri.
Bia.1 to Bia.m housing part 1 to m of the hollow structure Bia.
D1 first choke gap.
D2 second choke gap.
H opening stroke.
H1 first partial stroke.
H2 second partial stroke.
L longitudinal axis of the valve distributor tree.
M pig device (double-sphere pig device).
P process aggregate (general).
P1 first process aggregate.
P2 second process aggregate.
P3 third process aggregate.
Pi i-th process aggregate.
Pn n-th process aggregate.
R pipe connections (general), leading to the upper end of the respective valve distributor tree B1 to Bn
R1 first pipe connection.
R2 second pipe connection.
R3 third pipe connection.
Ri pipe connection associated with the valve distributor tree Bi.
Rn n-th pipe connection.
T tank (general), connected directly to an essentially vertically oriented valve distributor tree Bi.
T1 first tank in the abovementioned tank arrangement.
T2 second tank in the abovementioned tank arrangement.
T3 third tank in the abovementioned tank arrangement.
Ti i-th tank in the abovementioned tank arrangement.
Tn n-th tank in the abovementioned tank arrangement.
T1a to Tna lower tank bottom of a given tank (T1 to Tn) (or T1* to Tn*).
Tia i-th tank bottom.
T* tank (general),
    connected via pipeline Ri to an essentially vertically oriented valve distributor tree Bi.
T1* first tank in the abovementioned tank arrangement.
T2* second tank in the abovementioned tank arrangement.
T3* third tank in the abovementioned tank arrangement.
Ti* i-th tank in the abovementioned tank arrangement.
Tn* n-th tank in the abovementioned tank arrangement.
$V_C$ double-seal valve.
$V_R$ double-seat valve.
$V_S$ double-sealing disk valve.
W heat transfer medium. FIGS. 9, and 10a to 10c
20 advancing device (pump).
21 first shutoff valve.
22 second shutoff valve.
P** process aggregate (general), connected to an essentially horizontally oriented valve distributor tree Bi.
P1** first process aggregate in the abovementioned arrangement.
P2** second process aggregate in the abovementioned arrangement.
P3** third process aggregate in the abovementioned arrangement.
Pi** i-th process aggregate in the abovementioned arrangement.
Pn** n-th process aggregate in the abovementioned arrangement.
T** tank (general), connected to an essentially horizontally oriented valve distributor tree Bi.
T1** first tank in the abovementioned tank arrangement.
T2** second tank in the abovementioned tank arrangement.
T3** third tank in the abovementioned tank arrangement.
Ti** i-th tank in the abovementioned tank arrangement.
Tn** n-th tank in the abovementioned tank arrangement.
U circulation line (general).
U1 first circulation line (at the first valve distributor tree B1).
U2 second circulation line (at B2).
U3 third circulation line (at B3).
Ui i-th circulation line (at Bi).
Un n-th circulation line (at Bn).
U* parallel circulation line (general).
U1* first parallel circulation line
    (at the first valve distributor tree B1).
U2* second parallel circulation line (at B2).
U3* third parallel circulation line (at B3).
Ui* i-th parallel circulation line (at Bi).
Un* n-th parallel circulation line (at Bn).
Ux.1 first circulation line segment (general).
Ux.2 second circulation line segment (general).
Ux.3 third circulation line segment (general).
U1.1 first circulation line segment of the first circulation line.
Ui.1 first circulation line segment of the i-th circulation line.
Un.1 first circulation line segment of the n-th circulation line.
U1.2 second circulation line segment of the first circulation line.
Ui.2 second circulation line segment of the i-th circulation line.

Un.2 second circulation line segment of the n-th circulation line.
U1.3 third circulation line segment of the first circulation line.
Ui.3 third circulation line segment of the i-th circulation line.
Un.3 third circulation line segment of the n-th circulation line.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A device for piping of process systems in the food and beverage industry, which connects a tank (T) of the process system, at a lower tank bottom of the tank (T) or a process aggregate (P) of the process system, by means of a pipe connection, to a piping system (2, 3, 4), via a valve that is
which is anti-mixing in its seat region, said device comprised of a piping system (2, 3, 4) comprised of at least one pipeline (2.1, 2.2, ..., 2.i, ..., 2.n; 3.1, 3.2, ..., 3.1, ..., 3.n; 4) with at least one valve distributor tree (B1, B2, ..., Bi, ..., Bn) which comprises a hollow structure, which is elongated (B1a, B2a, ..., Bia, ..., Bna) and which has at least one connection opening (6a) for connecting its interior space with each of the pipelines (2.1, 2.2, ..., 2.i, ..., 2.n; 3.1, 3.2, ..., 3.1, ..., 3.n; 4), wherein at least one first group of pipelines (2.1, 2.2, ..., 2.i, ..., 2.n) and if necessary additionally a second group of pipelines (3.1, 3.2, ..., 3.i, ..., 3.n) on opposite sides of the hollow structure (B1a, B2a, ..., Bia, ..., Bna) are extended (2.1, 3.1; 2.2, 3.2 ..., 2.i, 3.i, ..., 2.n, 3.n) to the associated connection opening(s) (6a) and extend past the hollow structure, wherein the valve ($V_C$; $V_R$; $V_S$), which valve has a leakage space (14) between two axially separated sealing locations, which leakage space is connected to surroundings of the valve by at least one connection path, wherein said valve is further provided with a valve housing (7) in each connection between the pipeline (2.1, 2.2, ..., 2.i, ..., 2.n; 3.1, 3.2, ..., 3.1, ..., 3.n; 4) and the associated connection opening (6a), and which valve switches this connection in proximity to the hollow structure (B1a, B2a, ..., Bia, ..., Bna);
wherein the device comprises at least one of the following characteristics a, b, c and d:
characteristic (a) the respective valve distributor tree (B1, B2, ..., Bi, ..., Bn) opens directly into the lower tank bottom (T1a, T2a, Tia, ..., Tna) of an associated tank (T; T1, T2, ..., Ti, ..., Tn),
characteristic (b) the respective valve distributor tree (B1, B2, ..., Bi, ..., Bn) is connected via the associated pipe connection (R; R1, R2, ..., Ri, ..., Rn; Ux.1; U1.1, U2.1, U3.1, ..., Ui.1, ..., Un.1) to the process aggregate (P; P1, P2, ..., Pi, ..., Pn; P; P1, P2, ..., Pi, ..., Pn**) or the lower tank bottom (T1a, T2a, ..., Tia, ..., Tna) of the tank (T*; T1*, T2*, ..., Ti*, ..., Tn*; T; T1, T2, ..., Ti, ..., Tn**), and the pipe connection (R; Ux.1) opens out into the tank-side or process-aggregate-side end of the valve distributor tree (B1, B2, ..., Bi, ..., Bn);
characteristic (c) a stirring device (16) which is operative in the entire interior space of the hollow structure (B1a, B2a, ..., Bia, ..., Bna) is disposed in the valve distributor tree (B1, B2, ..., Bi, ..., Bn);
characteristic (d) the valve distributor tree (B1, B2, ..., Bi, ..., Bn) with the entire interior space of the hollow structure (B1a, B2a, ..., Bia, ..., Bna) is part of a circulation line (U; U1, U2, U3, ..., Ui, ..., Un) extending over the tank (T; T*; T) or the process aggregate (P, P);
and wherein the device comprises one of the following combinations of the characteristics ((a), (b), (c), (d)):
(i) characteristics (a) and (c),
(ii) characteristics (a) and (d);
(iii) characteristics (b) and (c),
(iv) characteristics (b) and (d);
(v) characteristics (a) and (b) and (c), or
(vi) characteristics (a) and (b) and (d).

2. A device according to claim 1 wherein
the stirring device (16) is arranged in the valve distributor tree (B1, B2, ..., Bi, ..., Bn) and which is operative in the entire interior space of the hollow structure (B1a, B2a, ..., Bia, ..., Bna).

3. A device according to claim 1 wherein
the circulation line (U; U1, U2, U3, ..., Ui, ..., Un) extending over the tank (T; T*; T) or the process aggregate (P; P); the valve distributor tree (B1, B2, ..., Bi, ..., Bn) with the entire interior space of the hollow structure (B1a, B2a, ..., Bia, ..., Bna) is part of this circulation line (U; U1, U2, U3, ..., Ui, ..., Un); the circulation line (U; U1, U2, U3, ..., Ui, ..., Un) with a first circulation line segment (Ux.1), which comprises the hollow structure (B1a, B2a, ..., Bia, ..., Bna) as an integral component, is connected to the tank (T; T*; T) or the process aggregate (P; P); and the circulation line (U; U1, U2, U3, ..., Ui, ..., Un) is returned into the tank (T; T*; T) or the process aggregate (P; P) via a third circulation line segment (Ux.3) in which an advancing device (20) is disposed.

4. A device according to claim 1 wherein:
the valve distributor tree (B1, B2, ..., Bi, ..., Bn) is double-walled, in its entirety or in partial regions; and intermediate space(s) (15c) forming a heat exchanger (15) is/are each connected with a respective feed and discharge connection (15a, 15b) for a heat exchange medium (W).

5. A device according to claim 1 wherein:
the valve distributor tree (B1, B2, ..., Bi, ..., Bn) extends from below upwards, typically vertically; and the first and second groups of pipelines (2.1, 2.2, ..., 2.i, ..., 2.n; 3.1, 3.2, ..., 3.1, ..., 3.n) are disposed in each case in an arrangement forming rows, in planes (2.1, 3.1; 2.2, 3.2; ..., 2.i, 3.i, ..., 2.n, 3.n) parallel to each other and to the longitudinal axis of the hollow structure.

6. A device according to claim 1 wherein:
the valve distributor tree (B1, B2, ..., Bi, ..., Bn) extends transversely, in the typical case horizontally, and the first and second groups of pipelines (2.1, 2.2, ..., 2.i, ..., 2.n; 3.1, 3.2, ..., 3.1, ..., 3.n) are disposed next to each other in mutually parallel planes, on one side of, or on opposite sides of, the hollow structure (B1a, B2a, ..., Bia, ..., Bna), and pass by said hollow structure in planes that intersect with the longitudinal axis (L) of said hollow structure.

7. A device according to claim 3, wherein:
a second circulation line segment (Ux.2), which bridges over at least the hollow structure (B1a, B2a, ..., Bia, ..., Bna), is provided, is designed as a bypass line to the first circulation line segment (Ux.1), and is merged with the latter on both sides.

8. A device according to claim 1 wherein:
the double-seat valve ($V_R$) is subjected to seat cleaning, by a respective partial stroke (H1, H2) of its closing members (10, 11); or the double-seal valve ($V_C$) is subjected to seat cleaning, by a respective partial stroke (H1, H2) of its closing member.

9. A device according to claim 8, wherein:
the seat cleaning of the first closing member (10) occurs through a first partial stroke (H1) in the direction opposite to the opening movement via an opening stroke (H), and the seat cleaning of the second closing member (11) occurs through a second partial stroke (H2) in the same direction as the opening movement; and, in the respective seat cleaning position, a leakage-space-side first choke gap (D1) is provided at the first closing member (10) and a second choke gap (D2) is provided at the second closing member (11) on the side facing away from the leakage space.

10. A device according to claim 1 wherein:
the hollow structure (B1a, B2a, . . . , Bia, . . . , Bna) in the region of the periphery of its connection opening (6a) is a ring-shaped housing (6), which, accommodates a seat surface of the anti-mixing valve ($V_C$; $V_S$) or the seat surfaces (6b, 6c) of the double seat valve ($V_R$) and/or serves for connection of the valve housing (7).

11. A device according claim 1 wherein:
the second closing member (11) opens out into a leakage and discharge housing (8) which connects to the valve housing (7) on the side of said valve housing directed away from the ring-shaped housing (6), and said closing member is held and sealed there.

12. A device according to claim 1 wherein:
with respect to the configuration, the longitudinal axis of the valve housing (7) extends horizontally, or, regarded from the connection opening (6a), at a downward angle with respect to the horizontal, up to a certain angle, and that an inner peripheral wall (11c) of the leakage space (14) is sloped in the direction of gravity toward the outlet opening of said leakage space.

13. A device according to claim 1 wherein:
the pipeline (2.1, 2.2, . . . , 2.i, . . . , 2.n; 3.1, 3.2, . . . , 3.1, . . . , 3.n; 4) over its entirety has an unobstructed circular flow cross-section and passes by and is in fluid connection with a respective valve housing (7) of the anti-mixing valve ($V_R$; $V_R$; $V_S$) or the respective valve housing (7) of the double-seat valve ($V_R$).

14. A device according to claim 1 wherein:
the hollow structure (B1a, B2a, . . . , Bia, . . . , Bna) is a cylindrical pipe.

15. A device according to claim 1 wherein:
the lowermost end of the hollow structure (B1a, B2a, . . . , Bia, . . . , Bna), the end of which is directed away from the associated tank (T1, T2, . . . , Ti, . . . , Tn) or the associated pipe connection (R; R1, R2, . . . , Ri, . . . , Rn), is connected to a third piping system (4).

16. A device according to claim 1 wherein:
the continuous pipelines (2.1, 2.2, . . . , 2.i, . . . , 2.n; 3.1, 3.2, . . . , 3.1, . . . , 3.n; 4) associated with all of the tanks (T1, T2, . . . , Ti, . . . , Tn) or pipe connections (R; R1, R2, . . . , Ri, . . . , Rn) are in the form of pipelines of respective similar function.

17. A device according to claim 1 wherein:
the valve distributor trees (B1, B2, . . . , Bi, . . . , Bn) are arranged in rows or matrices.

18. A device according to claim 1 wherein:
each of the hollow structures (B1a, B2a, . . . , Bia, . . . , Bna) is comprised of an aggregation of individual structural segments (5), which are connected together in the direction of the longitudinal axis (L) of the hollow structure so as to allow passage of fluid, and further have at least one connection opening (6a).

19. A device according to claim 18, wherein:
the structural segments (5) are formed in different sizes in the form of housing parts (Bia.1 to Bia.m).

20. A device according to claim 19, wherein:
the connection opening (6a) has a flow cross-section that depends on the size of the associated housing part (Bia.1 to Bia.m).

21. A device according to claim 1 wherein:
a stirrer shaft (16b) that bears at least one stirrer (16a) of the stirrer device (16) engages in the valve distributor tree (B1, B2, . . . , Bi, . . . , Bn) and extends along the longitudinal axis (L) of said tree.

22. A device according to claim 21, wherein:
the stirrer shaft (16b) is driven either from above by a first drive (A) or from below by a second drive (A*).

23. A device according to claim 22, wherein:
the first drive (A) is derived from a stirrer device in the tank (T1, T2, . . . , Ti, . . . , Tn) and the stirrer shaft (16b) is aligned flush with and joined to an upper stirrer shaft (16b1) via a coupling (16c), wherein the upper shaft (16b1) forms a prolongation of the stirrer shaft of the stirrer device in the tank (T1, T2, . . . , Ti, . . . , Tn).

24. A device according to claim 23, wherein:
the stirrer shaft (16b) is extended via the (lower) stirrer (16a) into a lower stirrer shaft (16b2), and the lower stirrer shaft is additionally rotatably mounted in a lower bearing (16d) on the lower end of the valve distributor tree (B1, B2, . . . , Bi, . . . , Bn).

25. A device according to claim 21, wherein:
the stirrer shaft (16b) at its end directed away from the drive (A, A*) is additionally rotatably mounted in a lower bearing (16d) or an upper bearing (16d*) in the associated end of the valve distributor tree (B1, B2, . . . , Bi, . . . , Bn).

26. A device according to claim 4, wherein:
a given partial region in a sector (or sectors) of the valve distributor tree (B1, B2, . . . , Bi, . . . , Bn) is delimited between the connection openings (6a).

27. A device according to claim 4, wherein:
the at least one stirrer (16a) is arranged in the sector of the valve distributor tree (B1, B2, . . . , Bi, . . . , Bn) which sector is delimited by the partial region of the heat exchanger (15).

28. A device for piping of process systems in the food and beverage industry, which connects a tank (T) of the process system, at a lower tank bottom of the tank (T) or a process aggregate (P) of the process system, by means of a pipe connection, to a piping system (2, 3, 4), via double-seat valves ($V_R$) which are designed to be anti-mixing in their seat region, the subject device being comprised of a piping system (2, 3, 4) comprised of at least one pipeline (2.1, 2.2, . . . , 2.i, . . . , 2.n; 3.1, 3.2, . . . , 3.1, . . . , 3.n; 4) with at least one valve distributor tree (B1, B2, . . . , Bi, . . . , Bn) which comprises a hollow structure, which is elongated (B1a, B2a, . . . , Bia, . . . , Bna) and which has at least one connection opening (6a) for connecting its interior space with each of the pipelines (2.1, 2.2, . . . , 2.i, . . . , 2.n; 3.1, 3.2, . . . , 3.1, . . . , 3.n; 4), wherein at least one first group of pipelines (2.1, 2.2, . . . , 2.i, . . . , 2.n) and if necessary additionally a second group of pipelines (3.1, 3.2, . . . , 3.i, . . . , 3.n) on opposite sides of the hollow structure (B1a, B2a, . . . , Bia, . . . , Bna) are extended (2.1, 3.1; 2.2, 3.2 . . . , 2.i, 3.i, . . . , 2.n, 3.n) to the associated connection opening(s) (6a) and extend past the hollow structure, and which device further has a double-seat valve ($V_R$), which valve is disposed in each connection between the pipeline (2.1, 2.2, . . . , 2.i, . .

..., 2.n; 3.1, 3.2, ..., 3.1, ..., 3.n; 4) and the associated connection opening (6a), and switches this connection in immediate proximity to the hollow structure (B1a, B2a, ..., Bia, ..., Bna), whereby said double-seat valve ($V_R$) is configured with two serially disposed closing members (10, 11) which in the closed position of the valve prevent flow of fluids from the hollow structure (B1a, B2a, ..., Bia, ..., Bna) into the valve housing (7), wherein one of the pipelines (2.1, 2.2, ..., 2.i, ..., 2.n; 3.1, 3.2, ..., 3.1, ..., 3.n; 4) is connected to the valve housing, wherein the closing members (10, 11) in the closed position and the opened position delimit a leakage space (14) which has at least one connection path with surroundings of the double-seat valve ($V_R$), wherein the first closing member (10) is independently driven and in its opening movement comes to abut against a second closing member (11) configured as a seat disc and carries the second closing member (11) also into the opened position, wherein the second closing member (11) on its end directed toward the first closing member (10) has a second seat seal (13) which cooperates with a second seat surface (6c) bordering a cylindrical first seat surface (6b), wherein the first closing member (10) in the form of a sliding plunger has a radially acting first seat seal (12), wherein the connection opening (6a) forms the cylindrical first seat surface (6b), and the first seat seal (12) is sealingly accommodated in the first seat surface (6b) when the valve is in the closed position, and wherein mutually concentrically disposed valve rods (10a, 11a) are provided for the closing members (10, 11), which rods pass into and out of the valve housing (7) on one side;

wherein the device comprises at least one of the following characteristics a, b, c and d;

characteristic (a) the respective valve distributor tree (B1, B2, ..., Bi, ..., Bn) opens directly into the lower tank bottom (T1a, T2a, Tia, ..., Tna) of the associated tank (T; T1, T2, ..., Ti, ..., Tn), characteristic (b) the respective valve distributor tree (B1, B2, ..., Bi, ..., Bn) is connected via the associated pipe connection (R; R1, R2, ..., Ri, ..., Rn; Ux.1; U1.1, U2.1, U3.1, ..., Ui.1, ..., Un.1) to the process aggregate (P; P1, P2, ..., Pi, ..., Pn; P; Pi, P2, ..., Pi, ..., Pn**) or the lower tank bottom (T1a, T2a, ..., Tia, ..., Tna) of the tank (T*; T1*, T2*, ..., Ti*, ..., Tn*; T; T1, T2, ..., Ti, ..., Tn**), and the pipe connection (R; Ux.1) opens out into the tank-side or process-aggregate-side end of the valve distributor tree (B1, B2, ..., Bi, ..., Bn);

characteristic (c) a stirring device (16) which is operative in the entire interior space of the hollow structure (B1a, B2a, ..., Bia, ..., Bna) is disposed in the valve distributor tree (B1, B2, ..., Bi, ..., Bn);

characteristic (d) the valve distributor tree (B1, B2, ..., Bi, ..., Bn) with the entire interior space of the hollow structure (B1a, B2a, ..., Bia, ..., Bna) is part of a circulation line (U; U1, U2, U3, ..., Ui, ..., Un) extending over the tank (T; T*; T) or the process aggregate (P, P);

and wherein the device comprises one of the following combinations of the characteristics ((a), (b), (c), (d)):
(i) characteristics (a) and (c),
(ii) characteristics (a) and (d);
(iii) characteristics (b) and (c), or
(iv) characteristics (b) and (d);
(v) characteristics (a) and (b) and (c), or
(vi) characteristics (a) and (b) and (d).

29. A device according to claim 28 wherein:
the second closing member (11), designed as a hollow rod, at its end section accommodating the second seat seal (13) has a cylindrical accommodating bore (11b) on the inside that is formed with the same diameter as the cylindrical first seat surface (6b);
and in the closed position of the second closing member (11), the accommodating bore (11b) and the first seat surface (6b) are flush against each other.

30. A device according to claim 28 wherein:
the second closing member (11), with a closing-member-side detent surface (11d), has a metallic detent on the second seat surface (6c), wherein an associated seat-surface-side detent surface (6e) immediately adjoins the first seat surface (6b).

31. A device according to claim 28 wherein:
a pipe connection (7a) on the valve housing (7) opens out tangentially, with respect to the configuration of the valve housing (7), with its lowest internal wall line disposed at the deepest point of the interior space of the valve housing (7).

* * * * *